US011729039B2

United States Patent
Simon et al.

(10) Patent No.: US 11,729,039 B2
(45) Date of Patent: Aug. 15, 2023

(54) ATSC 3.0 SINGLE FREQUENCY NETWORKS USED FOR POSITIONING NAVIGATION TIMING AND SYNERGY 4G / 5G NETWORKS

(71) Applicant: Sinclair Broadcast Group, Inc., Hunt Valley, MD (US)

(72) Inventors: Michael J. Simon, Frederick, MD (US); Mark A. Aitken, Parkton, MD (US); Ebenezer K. Kofi, Hunt Valley, MD (US); Louis Herbert Libin, Woodmere, NY (US)

(73) Assignee: SINCLAIR BROADCAST GROUP, INC., Hunt Valley, MD (US)

( * ) Notice: Subject to any disclaimer, the term of this patent is extended or adjusted under 35 U.S.C. 154(b) by 0 days.

(21) Appl. No.: 17/459,274

(22) Filed: Aug. 27, 2021

(65) Prior Publication Data

US 2022/0070042 A1   Mar. 3, 2022

Related U.S. Application Data

(60) Provisional application No. 63/072,477, filed on Aug. 31, 2020.

(51) Int. Cl.
*H04L 27/26* (2006.01)
*H04W 28/06* (2009.01)

(52) U.S. Cl.
CPC ......... *H04L 27/2626* (2013.01); *H04W 28/06* (2013.01)

(58) Field of Classification Search
CPC .. H04H 60/51; H04N 21/235; H04N 21/2383; H04N 21/25841; H04N 21/4382;
(Continued)

(56) References Cited

U.S. PATENT DOCUMENTS 6,859,173 B2   2/2005   Spilker, Jr. et al.
9,438,459 B2   9/2016   Simon et al.
(Continued)

FOREIGN PATENT DOCUMENTS

WO   WO 2004/057360 A2   7/2004
WO   WO 2020/091686 A1   5/2020

OTHER PUBLICATIONS

ATSC Organization: "A/321: 2016-A/321, System Discovery and Signaling," ATSC, Advanced Television Systems Comitee, 1776 K Street N.W., Washington, D.C. 20006, USA, Mar. 23, 2016, XP017860431, Retrieved form the Internet: URL: https://www.atsc.org/wp-content/uploads/2020/05/A300-2020-Normative-References.zipA321-2016-System-Discovery-and-Signaling.pdf [retrieved on Mar. 24, 2021].

(Continued)

*Primary Examiner* — Sung S Ahn
(74) *Attorney, Agent, or Firm* — Sterne, Kessler, Goldstein & Fox P.L.L.C.

(57) ABSTRACT

According to some embodiments, a method includes selecting a length for an advanced television system committee (ATSC) 3.0 frame for transmission by a single frequency network (SFN) transmitter and aligning the SFN transmitter with a global positioning system (GPS) epoch. The method further includes storing geographical coordinates of the SFN transmitter and a corresponding SFN transmitter identification (TX ID) in a database. The method also includes encoding the SFN TX ID in a non-coherent symbol of a plurality of positioning navigation timing (PNT) symbols comprising a plurality of coherent symbols and the non-coherent symbol with orthogonal frequency-division multiplexing (OFDM) numerology to support positioning. The method further includes prepending the plurality of PNT symbols to the ATSC 3.0 frame to generate a modified ATSC (Continued)

3.0 frame and transmitting the modified ATSC 3.0 using a SFN transmitter antenna of the SFN transmitter.

20 Claims, 25 Drawing Sheets

(58) Field of Classification Search
CPC . G01S 1/68; G01S 5/10; G01S 1/0428; H04L 5/005
See application file for complete search history.

(56) References Cited

U.S. PATENT DOCUMENTS

| | | | |
|---|---|---|---|
| 9,955,449 | B2 | 4/2018 | Kang et al. |
| 10,079,708 | B2 | 9/2018 | Simon et al. |
| 10,116,973 | B2 | 10/2018 | Earnshaw et al. |
| 10,432,384 | B2 | 10/2019 | Simon |
| 10,439,683 | B1 * | 10/2019 | Baumgartner ........ H04L 1/0058 |
| 10,568,026 | B2 * | 2/2020 | Simon .................... H04W 76/50 |
| 10,652,849 | B2 | 5/2020 | Simon |
| 2009/0175379 | A1 | 9/2009 | Rubin et al. |
| 2019/0199460 | A1 | 6/2019 | Simon et al. |
| 2019/0305901 | A1 | 10/2019 | Opshaug et al. |
| 2020/0178121 | A1 | 6/2020 | Simon et al. |
| 2020/0245372 | A1 | 7/2020 | Lei et al. |

OTHER PUBLICATIONS

Background ATSC 3.0 and Broadcast Internet, Jul. 13, 2020 (Jul. 13, 2020), pp. 1-2, XP055892808, Retrieved from the Internet: URL: https://www.nist.gov/system/files/documents/2020/07/13/pnt-0019-attach1.pdf.
International Search Report and Written Opinion of the International Searching Authority directed to related International Patent Application No. PCT/US2021/047917, dated Apr. 25, 2022; 20 pages.
Martone et al., "Prime Time Positioning: Using Broadcast TV Signals to Fill GPS Acquisition Gaps," Sep. 1, 2005, 9 pages.
Park et al., "ATSC 3.0 Transmitter Identification Signals and Applications," IEEE Transactions on Broadcasting, vol. 63, Issue: 1, Mar. 2017, 10 pages.
Mike Simon, Comments Received for RFI on Profile of Responsible Use of Positioning, Navigation, and Timing Services on NIST.gov, Jul. 13, 2020, 2 pages.
Simon et al., "ATSC 3.0 Broadcast 5G Unicast Heterogeneous Network Converged Services Starting Release 16," IEEE Transactions on Broadcasting; vol. 66, Issue: 2, Jun. 2020; 10 pages.

* cited by examiner

1200

1201 → $m_i^n = \left( \sum_{k=0}^{(14-i)} b_k^n \right) \mod 2 \quad \begin{matrix} i > 14 - N_b^n \\ i = 14 - N_b^n \\ i < 14 - N_b^n \end{matrix} \quad \begin{matrix} \\ 1 \\ 0 \end{matrix}$

1202

1203 → Signaling (8) bit values for the *n*-th bootstrap symbol using a Gray code Note: Error Tolerance Gray Code all 256 Cyclic Shifts separated by <u>128 Samples (1/Fs)</u> time domain 1205 → Both tables same just re-ordered to see error tolerance easier

*Signaling ascending Order*
1204a

| (8) Signaling Bits (Binary) | Relative Cyclic Shift (Binary) | Relative Cyclic Shift (Decimal) |
|---|---|---|
| 00000000 | 00000000001000000 | 64 |
| 00000001 | 00000000011000000 | 192 |
| 00000010 | 00000000111000000 | 448 |
| 00000011 | 00000000101000000 | 320 |
| 00000100 | 00000001111000000 | 960 |
| 00000101 | 00000001101000000 | 832 |
| 00000110 | 00000001001000000 | 576 |
| 00000111 | 00000001011000000 | 704 |
| ... | ... | ... |
| 10000001 | 11111110101000000 | 32576 |
| 10000000 | 11111111111000000 | 32704 |
| 11111000 | 10101011111000000 | 22464 |
| 11111001 | 10101011101000000 | 22336 |
| 11111010 | 10101011001000000 | 22080 |
| 11111011 | 10101011011000000 | 22208 |
| 11111100 | 10101010011000000 | 21568 |
| 11111101 | 10101010001000000 | 21696 |
| 11111110 | 10101010111000000 | 21952 |
| 11111111 | 10101010101000000 | 21832 |

*Cyclic Shifts ascending Order*
1204b

| (8) Signaling Bits (Binary) | Relative Cyclic Shift (Binary) | Relative Cyclic Shift (Decimal) |
|---|---|---|
| 00000000 | 00000000001000000 | 64 |
| 00000001 | 00000000011000000 | 192 |
| 00000011 | 00000000101000000 | 320 |
| 00000010 | 00000000111000000 | 448 |
| 00000110 | 00000001001000000 | 576 |
| 00000111 | 00000001011000000 | 704 |
| 00000101 | 00000001101000000 | 832 |
| 00000100 | 00000001111000000 | 960 |
| ... | ... | ... |
| 11111100 | 10101010001000000 | 21568 |
| 11111101 | 10101010011000000 | 21696 |
| 11111111 | 10101010101000000 | 21832 |
| 11111110 | 10101010111000000 | 21952 |
| 11111010 | 10101011001000000 | 22080 |
| 11111011 | 10101011011000000 | 22208 |
| 11111001 | 10101011101000000 | 22336 |
| 11111000 | 10101011111000000 | 22464 |
| ... | ... | ... |
| 10000001 | 11111110101000000 | 32576 |
| 10000000 | 11111111111000000 | 32704 |

Note: increase # signal bits reduced error tolerance or decrease # signal bits increased error tolerance of Gray code (2-12 bits)

FIG. 12

ATSC 3.0 SINGLE FREQUENCY NETWORKS USED FOR POSITIONING NAVIGATION TIMING AND SYNERGY 4G / 5G NETWORKS

CROSS-REFERENCE TO RELATED APPLICATIONS

This application claims priority to U.S. Provisional Application No. 63/072,477 titled "ATSC 3.0 Single Frequency Networks Used for Positioning Navigation Timing and Synergy 5G Heterogeneous Networks," filed on Aug. 31, 2020, which is hereby incorporated by reference in its entirety for all purposes.

This application is also related to U.S. Pat. No. 10,079,708 issued Sep. 18, 2018; U.S. Pat. No. 9,438,459 issued Sep. 6, 2016; U.S. Pat. No. 10,116,973 issued Oct. 30, 2018; U.S. Pat. No. 10,568,026 issued Feb. 18, 2020; U.S. Pat. No. 10,652,849 issued May 12, 2020; and U.S. Patent Application Publication No. 2020/0178121 published Jun. 4, 2020, all of which are herein incorporated by reference in their entireties for all purposes.

BRIEF SUMMARY

According to some embodiments, a method includes selecting a length for an advanced television system committee (ATSC) 3.0 frame for transmission by a single frequency network (SFN) transmitter and aligning the SFN transmitter with a global positioning system (GPS) epoch. The method further includes storing geographical coordinates of the SFN transmitter and a corresponding SFN transmitter identification (TX ID) in a database. The method also includes encoding the SFN TX ID in a non-coherent symbol of a plurality of positioning navigation timing (PNT) symbols comprising a plurality of coherent symbols and the non-coherent symbol with orthogonal frequency-division multiplexing (OFDM) numerology to support positioning. The method further includes prepending the plurality of PNT symbols to the ATSC 3.0 frame to generate a modified ATSC 3.0 frame and transmitting the modified ATSC 3.0 using a SFN transmitter antenna of the SFN transmitter.

According to some embodiments, a non-transitory computer-readable medium includes instructions stored thereon that, when executed by at least one computing device, cause the at least one computing device to perform operations including selecting a length for an advanced television system committee (ATSC) 3.0 frame for transmission by a single frequency network (SFN) transmitter and aligning the SFN transmitter with a global positioning system (GPS) epoch. The operations further include storing geographical coordinates of the SFN transmitter and a corresponding SFN transmitter identification (TX ID) in a database. The operations also include encoding the SFN TX ID in a non-coherent symbol of a plurality of positioning navigation timing (PNT) symbols comprising a plurality of coherent symbols and the non-coherent symbol with orthogonal frequency-division multiplexing (OFDM) numerology to support positioning. The operations further include prepending the plurality of PNT symbols to the ATSC 3.0 frame to generate a modified ATSC 3.0 frame and transmitting the modified ATSC 3.0 using a SFN transmitter antenna of the SFN transmitter.

According to some embodiments, an apparatus includes a memory to store instructions and a processor configured to perform the instructions. The processor is configured to select a length for an advanced television system committee (ATSC) 3.0 frame for transmission by a single frequency network (SFN) transmitter and align the SFN transmitter with a global positioning system (GPS) epoch. The processor is further configured to store geographical coordinates of the SFN transmitter and a corresponding SFN transmitter identification (TX ID) in a database and encode the SFN TX ID in a plurality of positioning navigation timing (PNT) symbols. The processor is also configured to prepend the plurality of PNT symbols to the ATSC 3.0 frame to generate a modified ATSC 3.0 frame and transmit the modified ATSC 3.0 using a SFN transmitter antenna of the SFN transmitter.

BRIEF DESCRIPTION OF THE DRAWINGS

In the accompanying drawings, structures are illustrated that, together with the detailed description provided below, describe exemplary embodiments of the claimed method and system. Like elements are identified with the same reference numerals. Elements shown as a single component can be replaced with multiple components, and elements shown as multiple components can be replaced with a single component. The drawings are not to scale, and the proportion of certain elements can be exaggerated for illustration.

FIG. 12 illustrates example of signaling using cyclic shifts ZC and PN in time domain and using Gray code mapping for PRS symbol 1 and PRS symbol 2, in accordance with some embodiments.

DETAILED DESCRIPTION

Figure 1:
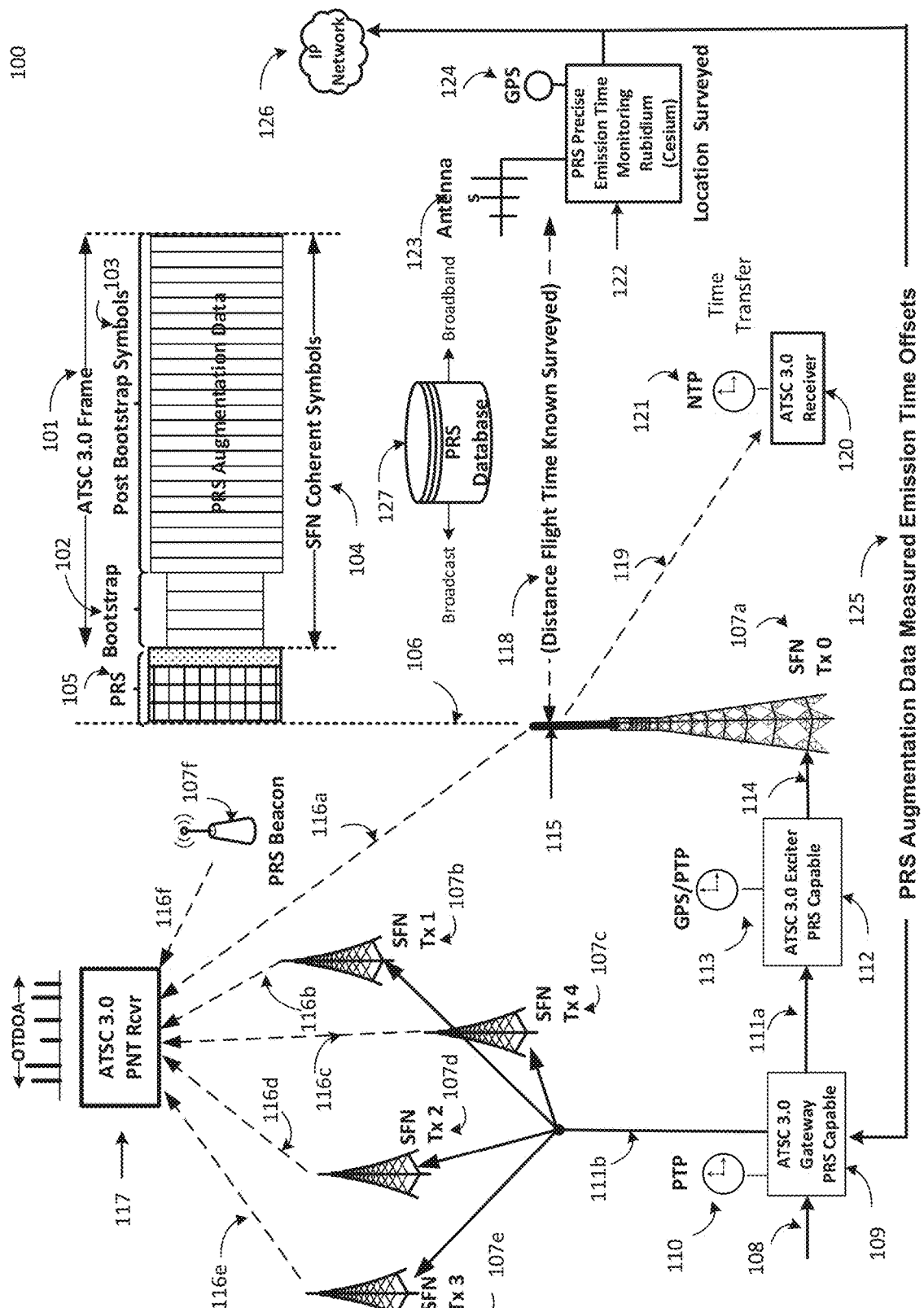
FIG. 1 illustrates an exemplary Advanced Television Systems Committee (ATSC) 3.0 Single Frequency Network (SFN) transmitters and a Positioning Reference Symbol (PRS) Beacon transmitter with PRS prepended to a coherent SFN ATSC 3.0 frame for enabling positioning navigation timing (PNT) and the broadcast and/or broadband distribution of PRS augmentation data to a PNT receiver coupled to the PRS database, in accordance with some embodiments.

The present disclosure is related to systems and methods using extensions to U.S. Pat. No. 10,079,708 issued Sep. 18, 2018; U.S. Pat. No. 9,438,459 issued Sep. 6, 2016; U.S. Pat. No. 10,568,026 issued Feb. 18, 2020; U.S. Pat. No. 10,116,973 issued Oct. 30, 2018, to disclose synergistically a positioning, navigation, timing (PNT) system using synchronized Advanced Television System Committee (ATSC) 3.0 single frequency network (SFN) transmitters. Each emitted SFN transmitter signal has unique PNT symbols referred to herein as Positioning Reference Symbols (PRS) inserted. The use of PRS can enable cross-correlation techniques to identify each SFN transmitter signal and measurement of the relative time of arrival at PNT receiver.

In one embodiment, a method is disclosed. The method disclosed herein can use a plurality of, for example, three or more ATSC 3.0 SFN transmitters using the same carrier frequency. ATSC 3.0 frame lengths can be selected and aligned with GPS epoch as described in, for example, U.S. Patent Application Publication No. 2020/0178121, published Jun. 4, 2020, which is incorporated by reference in its entirety. The center of radiation of each SFN transmitter antenna can be surveyed, and the latitude, longitude, and altitude can be placed in a PRS database. The PRS can be composed of a Zadoff Chu and PN sequence and a Gold code sequence. The PRS database is available to all positioning, navigation, and timing (PNT) receivers, according to some embodiments. The PRS database includes the coordinates of SFN transmitter antennas and other data to aid a PNT receiver for purposes of positioning, navigation, and timing.

In some embodiments, by way of a non-limiting example, an ATSC 3.0 emission time field monitoring station can measure the emission time of PRS symbols at transmitting antenna and can measure time offset errors relative to GPS, as defined in U.S. Patent Application Publication No. 2020/0178121, published Jun. 4, 2020. The station can transmit or broadcast the monitored emission time offset errors of PRS symbols to the PNT receiver as augmentation data. The PNT receiver, using PRS database and the received augmentation data of the emission time offset errors of each SFN transmitter, can detect the time of arrival of each PRS symbol of each SFN transmitter at the PNT receiver using cross-correlation techniques. The PNT receiver can compensate for emission time errors for improving accuracy of detecting the position of the PNT receiver.

In some embodiments, the observed time distance of arrival (OTDOA) can be calculated between three or more PRS symbols that are simultaneously received. Then using multilateralization or hyperbolic techniques, the position location is calculated, and the position correction of the PNT receiver can be determined at the PNT receiver independently. The correction is then passed to upper layer mapping software, for example, Google Maps, etc., that plots the PNT receiver position on a geographic map.

The methods disclosed herein can provide a positioning accuracy of approximately 6 meters with the time monitoring station using a rubidium or cesium clock and broadcast of augmentation data, according to some embodiments.

In another embodiment, a system, according to the method as described herein, can provide PNT services if GPS becomes compromised or unavailable for an extended period.

The method, as disclosed herein according to some embodiments, enables locating any number of ATSC 3.0 SFN transmitters and or PRS Beacon transmitters to improve the quality of the delivered services and PNT reliability.

The method also provides time transfer (e.g., accurate time transfer) to a PNT receiver and/or accurate time for commercial, industrial applications in the event of GPS disruption in service, using holdover techniques for extended periods of time.

In some embodiments, determining OTDOA PRS fix using a 4G system or a 5G system located on the same receiver as broadcast PNT is disclosed for use cases, such as enabling device based geo-fencing emergency alerts and location-based advertising.

The detailed description of SFN transmission system architecture, timing, and waveforms using PRS is described herein that permits OTDOA measurements by the PNT receiver. Multilateralizations hyperbolic position equations and algorithms described herein may be used for determining a 2D and or 3D position fix once the OTDOA can be made. By way of a non-limiting example, once position PRS correction is obtained, it can be passed to a mapping software, for example, Google Maps, etc., and the position correction can be displayed on a geographic map.

Various embodiments for the transmission side architecture, waveforms, and timing are described in detail below.

In some embodiments, the present disclosure is directed to extensions to enable ATSC 3.0 SFN means to support PNT, designed for backward compatibility, not to disturb existing ATSC 3.0 receivers without knowledge of PRS used for PNT. In some embodiments, the present disclosure is directed to introduce mobile extensibility, without disturbing legacy ATSC 3.0 receivers.

Various embodiments described herein can be used for providing location-based services in wireless networks to support various applications on a receiver and providing services for the public interest and safety.

In some embodiments, the PNT system, as disclosed herein, is designed to continue operation for an extended period (holdover) when GPS is unavailable or compromised over an area or whole city. The method and system disclosed herein can help in achieving GPS resiliency.

FIG. 1 illustrates an exemplary ATSC 3.0 SFN system 100 with PRS symbols 105 prepended to the coherent SFN ATSC 3.0 frame 101 to enable positioning navigation timing (PNT), in accordance with some embodiments. System 100 enables broadcast of PRS augmentation data 125 or broadband 126 that aids PNT receiver accuracy, in accordance with some embodiments. System 100, as shown in FIG. 1 illustrates one example of a system architecture to reliably deliver position navigation timing (PNT) services using an ATSC 3.0 SFN 107a-107e based on SFN coherent symbols 104 in an existing ATSC 3.0 frame 101 including bootstrap 102 and post bootstrap 103 symbols. The ATSC 3.0 frame 101 can include PRS symbols 105 prepended that are received by a PNT receiver 117. A PRS Beacon Tx 107f is also part of the SFN and broadcast only PRS symbols 105 is used to increase the number of signals with PRS arriving at PNT receiver 117.

In accordance with some embodiments, the PRS symbols 105 can be a sequence of Zadoff-Chu and PN coherent symbols and the last symbol as a Gold code sequence that is non-coherent by design to uniquely identify each SFN transmitter 107a-107e at PNT receiver 117. Also, PRS beacon 107f signal can be transmitted using Gold code sequence and cross-correlation techniques.

In accordance with some embodiments, each SFN transmitter can be assigned a PRS symbol 105 with a unique Gold code sequence. The unique Gold code sequence assigned to each SFN transmitter 107a-107e and/or PRS beacon 107f can be stored in a central PRS database 127. The central database 127 can be available to PNT receiver 117 via broadcast or broadband. By way of a non-limiting example, PNT receiver 117 can include a local copy of PRS database 127. The local copy of PRS database 127 may be updated at a user-specified time interval. PNT receiver 117 uses cross-correlation techniques using a unique Gold code sequence for each SFN transmitter 107a-107e and/or PRS beacon 107f to detect the exact arrival time at PNT receiver 117.

In accordance with some embodiments, ATSC 3.0 IP data services 108 to be emitted may be received at an ATSC 3.0 Gateway 109. By way of a non-limiting example, the ATSC 3.0 Gateway 109 may be instantiated in hardware or as a software function using SDN/NFV (network functions virtualization) in a cloud-native architecture aligned with 3GPP ($3^{rd}$ Generation Partnership Project) 5G Open RAN (Radio Access Network).

The ATSC 3.0 Gateway 109 can include a network clock Precision Time Protocol (PTP) 110. The ATSC 3.0 Gateway 109 schedules transmission of PRS symbols along with augmentation data 125 to be broadcast to PNT receiver 117 (e.g., an ATSC 3.0 PNT receiver). The output from the ATSC 3.0 Gateway 109 is shown as 111a and 111b to a PRS capable ATSC 3.0 exciter 112 and SFN transmitters 107a-107e, respectively The PRS capable ATSC 3.0 exciter 112 can be coupled with GPS or PTP network clock 113. The input signals at the ATSC 3.0 exciter 112 are converted to RF signal 114 and emitted by a transmit antenna 115 for sending to each SFN transmitter 107a-107e.

Emitted SFN signals 116a-116f are shown arriving at PNT receiver 117. Using PRS symbols 105 in the received SFN signals 116a-116f, the observed time difference of arrival (OTDOA) of signals can be measured by PNT receiver 117. To ensure proper cadence of insertion of PRS symbols and time coherency of emission, SFN transmitters emissions are synchronized using GPS/PTP clock 113 and ATSC 3.0 frames are time-aligned at the transmit antenna 115 air interface 106 using GPS epoch as described in detail below.

In accordance with some embodiments, when signal 119 received by an ATSC 3.0 receiver 120, which is not PNT capable, NTP 121 time is transferred by the SFN transmitter 107a as defined in ATSC 3.0 standard. More accurate time transfer using TAI for mobile use cases or for business purposes is described in U.S. Pat. No. 10,652,849 issued May 12, 2020, as previously mentioned and is herein incorporated by reference for all purposes.

In accordance with some embodiments, to ensure the most accurate measurement and calculation of OTDOA of the signals at PNT receiver 117, an emission time monitoring station 122 can be used. Time monitoring station 122 can include or be coupled to GPS 124. Time monitoring station 112 can also include an internal atomic clock based on rubidium or cesium. Antenna 123 of time monitoring station 112 can be calibrated according to the inputs of the internal delay to ensure measurement of RF or SFN signals 116a-116f The location (e.g., latitude, longitude, altitude) of time monitoring station 122, and each SFN transmit antenna 115, can be surveyed and stored in PRS database 127. Therefore, as an example, if distance 118 and flight time of signal between transmit antenna 115 and time monitoring station 122 is known, then the time of emission can be measured by time monitoring station 122.

The arrival time of PRS symbols 105 from SFN signals 116a-116f is observed by time monitoring station 122 using the cross-correction of PRS symbols 105. By knowing distance 118 and the knowledge of PRS symbols 105 that is aligned with GPS Epoch, which is deterministic and calculable, can allow time monitoring station 122 to measure any time offset errors in emission time of SFN signals 116a-116f at the transmit antenna 115. The time offset errors may be measured in nanoseconds.

At speed of light, a radio wave in 1 nanosecond can travel distance of 1 foot. Therefore, to achieve PNT accuracy of, for example, +/−6 meters requires knowledge of any small errors in emission times of all SFN transmitters since OTDOA is measured by PNT receiver 117. These errors can be measured by time monitoring station 122 and become part of augmentation data 125, which is broadcast as post bootstrap symbols 103 to assist PNT receiver 117 in improving accuracy in measuring time difference of arrival.

According to some embodiments, by using time monitoring station 122, small timing error caused by thermal drift can be measured and broadcasted in augmentation data 125. These errors used in the calculations at PNT receiver 117 for OTDOA can be cancelled or removed, and therefore, accuracy can be maintained. Time monitoring station 122 can continue its operations based on the internal atomic clock if GPS becomes compromised over an area or whole city. Time monitoring station 122 can continue the atomic clock and would track increasing drifts of SFN transmitters without GPS running on holdover for extended periods of time and PNT accuracy is maintained in absence of GPS as described below. With augmentation data 125 and with the data in database 127 latitudes, longitude, and altitude of all SFN transmit antennas center of radiation are available at PNT receiver 117, permitting calculations of location and allowing fast correction of several milliseconds independently at PNT receiver 117 after PRS symbols 105 are received.

Figure 23:
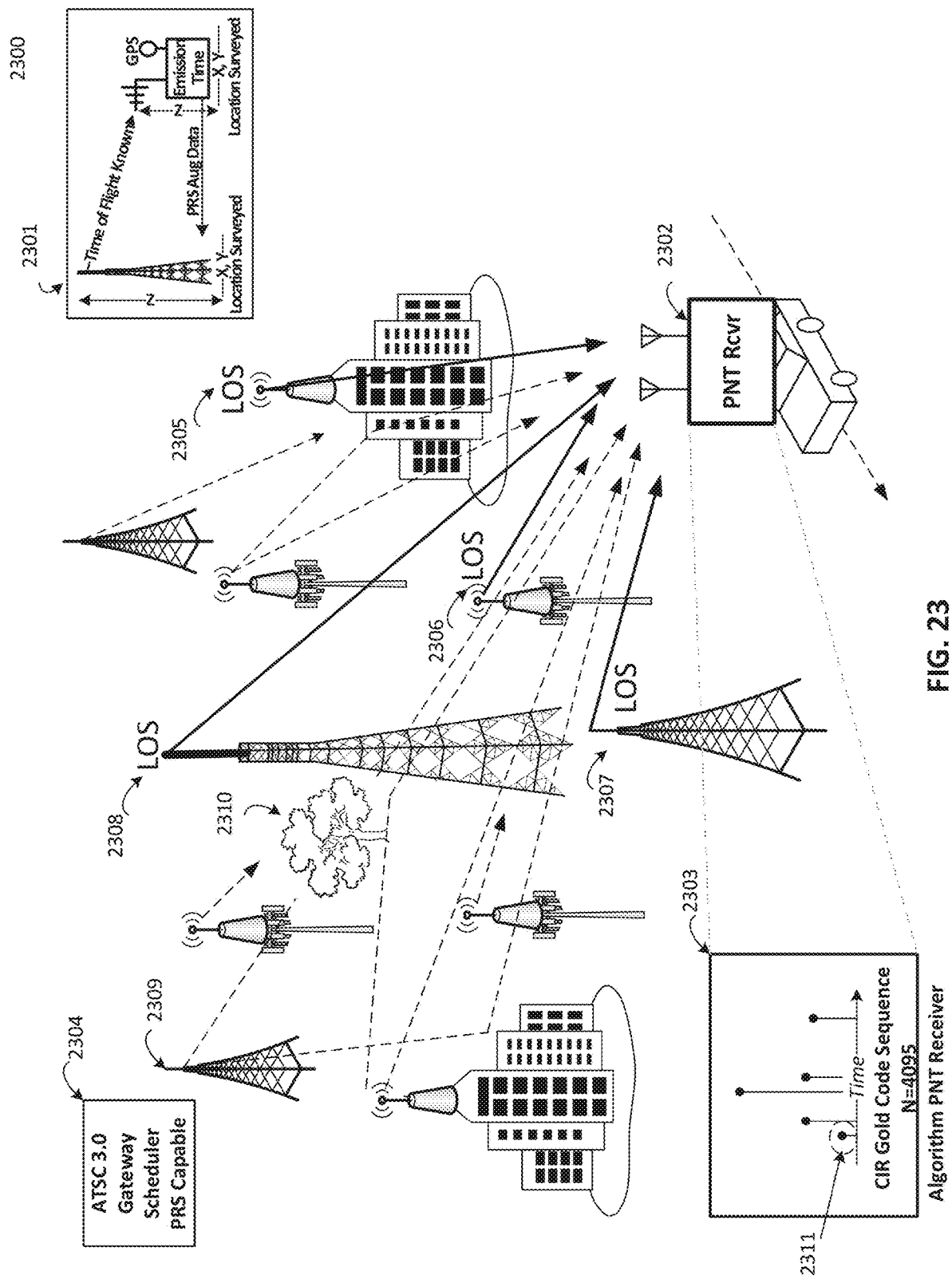
FIG. 23 illustrates benefit of broadcast PNT diversity having several SFN transmitters, including different frequencies and PRS beacon transmitters simultaneously available for the PNT receiver to choose as its moves in the environment to improve reliability of PNT service, in accordance with some embodiments.

The speed of light is constant and known. Accordingly, the SFN transmitter signals have much higher power at PNT receiver 117 (e.g., compared to a GPS system) and are at fixed locations. Once the location established in database 127, the location can remain stable unless changes are made in the network. The timing of the PNT network uses known GPS epoch, and time monitoring station 122 can continuously measure any errors and broadcast or use broadband 126 to send augmentation data 125 to PNT receiver 117. The number of SFN transmitters required simultaneously to get 2D location is three, according to some embodiments. In system 100, five SFN transmitters 107a-107e are shown, and one PRS Beacon transmitter 107f is shown. With a good view of the sky, a GPS receiver can have six or more satellites out of 24 in GPS constellation to choose dynamically as the GPS receiver roams in the urban environment, etc. As shown in FIG. 23, many SFN transmitters and PRS Beacons using multiple carrier frequencies can enable PNT receiver 2301 of FIG. 23 to choose dynamically from many PRS symbols as PNT receiver 117 or 2301 roams in the urban environment, etc.

The strong RF broadcast signals also have good propagation characteristics, in contrast to GPS satellite signals that are weak −30 db below noise floor at the GPS receiver. Also, because of multiple SFN transmitters, PRS symbols are simultaneously available at the PNT receiver, and using a Gold code sequence (e.g., N=4095) with good cross correlation properties as described using FIG. 14, the PRS based broadcast local positioning system offers many advantages as described in this disclosure.

Figure 2:
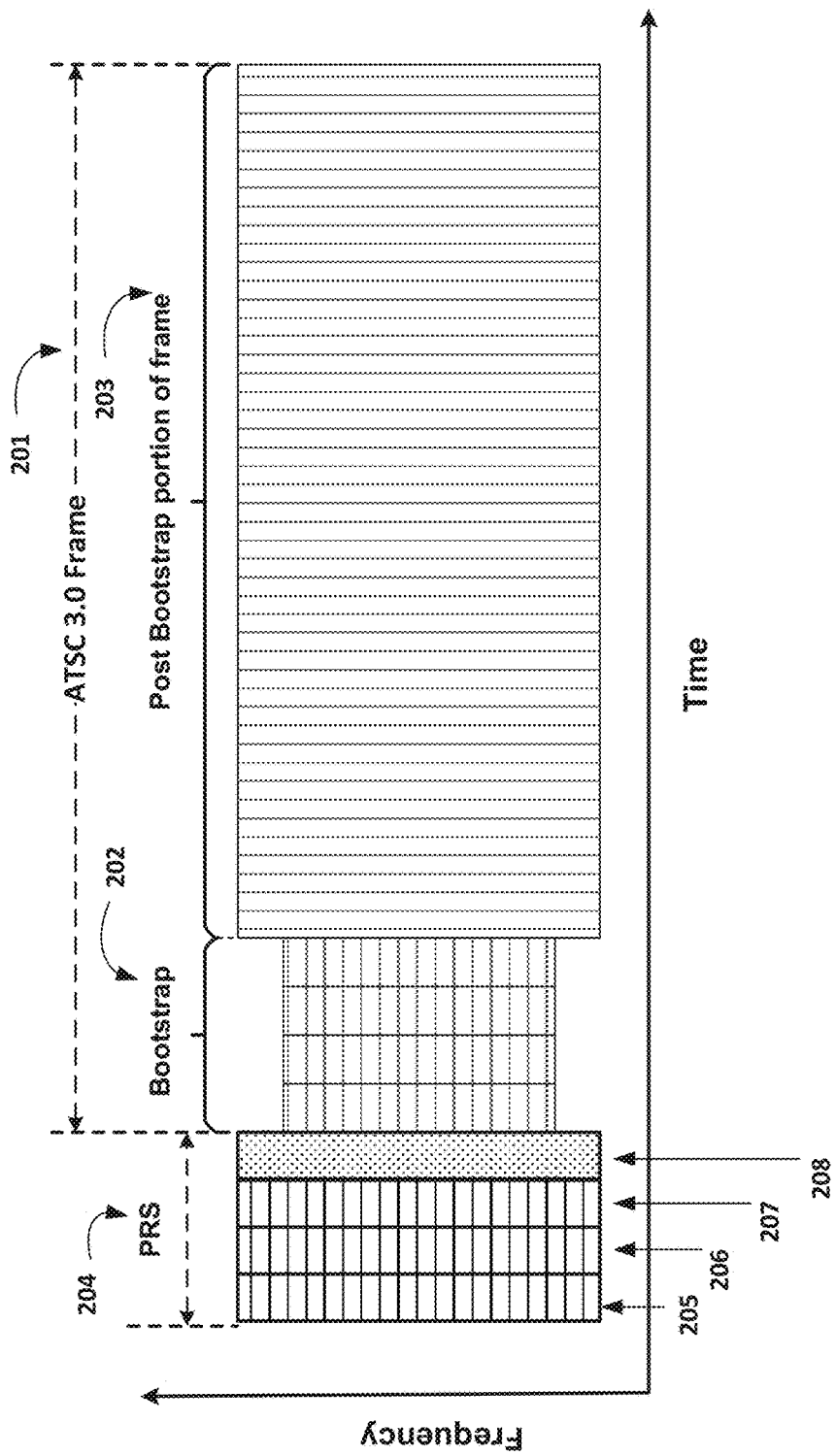
FIG. 2 illustrates PRS symbols pre-pended to ATSC 3.0 bootstrap symbols, which begins an ATSC 3.0 frame, in accordance with some embodiments.

FIG. 2 illustrates a diagram 200 illustrating PRS symbols 204 pre-pended before ATSC 3.0 bootstrap symbols, which begin an ATSC 3.0 frame, in accordance with some embodiments. Diagram 200 of FIG. 2 shows an example of ATSC 3.0 frame 201, including bootstrap symbols 202 defined by the ATSC 3.0 standard A/321 and as discussed in U.S. Pat. No. 10,079,708, issued on Sep. 18, 2018, and incorporated by reference in its entirety for all purposes. ATSC 3.0 frame 201 further includes post bootstrap portion 203 as defined by ATSC 3.0 standard A/322.

PRS symbols 204 are pre-pended to the ATSC 3.0 frame 201. By way of a non-limiting example, PRS symbols 204 can include four symbols 205-208. The first symbol 205 is coherent and is transmitted by all SFN transmitters and used for synchronization on PNT receiver 117. Symbol 205 is composed of a Zadoff Chu (ZC) sequence and a PN sequence. The ZC root value is uniquely assigned and identifies the symbol as PRS and the assigned PN seed identifies time zone 1002 (of FIG. 10) of SFN transmitter when correlated at the PNT receiver.

Second and third PRT symbols 206, 207 are ZC and PN sequences and are coherent and transmitted by all SFN transmitters and used for signaling by using cyclic shifts in time domain to signal information related to PNT as shown using FIG. 12.

Fourth PRT symbol 208 is a non-coherent Gold code sequence and is uniquely assigned to each SFN transmitter or beacon transmitter. By uniquely initializing Gold code sequence generator, as shown using FIG. 13, a unique Gold sequences can be created for each SFN transmitter and PRS beacon transmitter.

Figure 3:
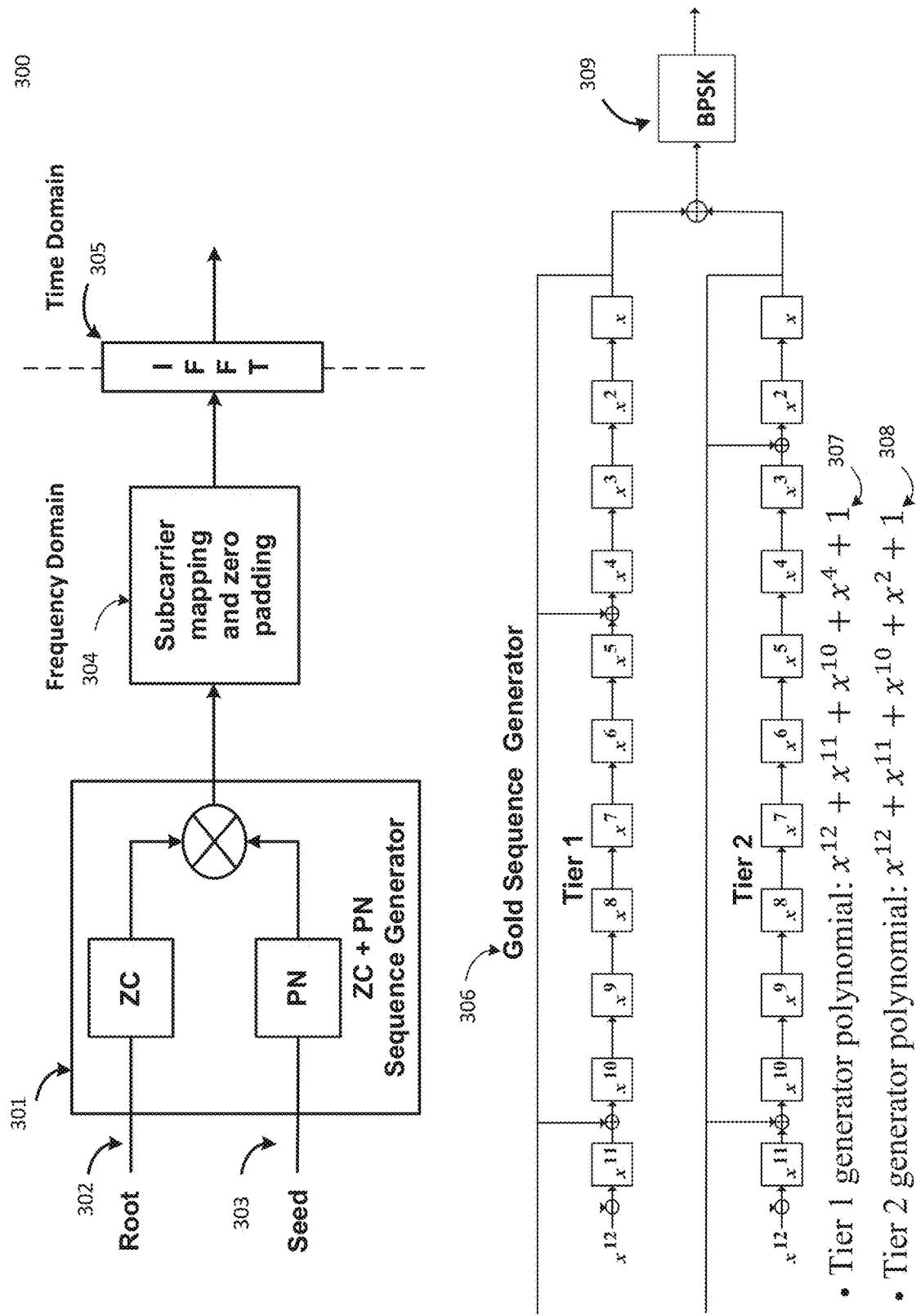
FIG. 3 illustrates a Zadoff Chu and PN sequence generator and a Gold code sequence generator, which forms a composite PRS, in accordance with some embodiments.

FIG. 3 illustrates diagram 300 illustrating a ZC and PN sequence generator 301 accepting ZC root value 302 and PN seed value 303. The ZC and PN sequence generated by ZC and PN sequence generator 301 is converted in frequency domain using subcarrier mapping and zero padding 304 and in time domain using Inverse Fast Fourier Transform (IFFT) 305. ZC and PN sequence generator 301 is used for generating PRS symbols 205, 206, 207 of FIG. 2, in accordance with some embodiments.

By way of a non-limiting example, the number of ZC cyclic shifts with good cross correlation properties is not large. However, combining PN sequence with ZC cyclic shift can cause a phase rotation of each ZC individual subcarrier and result in an extended range of near-ideal autocorrelation responses as described in U.S. Pat. No. 10,079,708 issued on Sep. 18, 2018. The ZC and PN sequence in PRS symbols 206, 207 enables a large range of near-ideal cyclic shifts of ZC to be used for signaling. The natural properties of ZC alone may not support this functionality as defined in U.S. Pat. No. 10,079,708 issued Sep. 18, 2018, and therefore ZC and PN sequence can be used as described herein in accordance with some embodiments.

Gold sequence generator 306 is made up of two sequences of equal length m shown as tier 1 and tier 2 in FIG. 3. An output of Gold sequence generator 306 is binary phase shift key BPSK modulated 309. By way of a non-limiting example, the tier 1 generator polynomial 307 and the tier 2 generator polynomial 308 can be as shown in FIG. 3.

Figure 4:
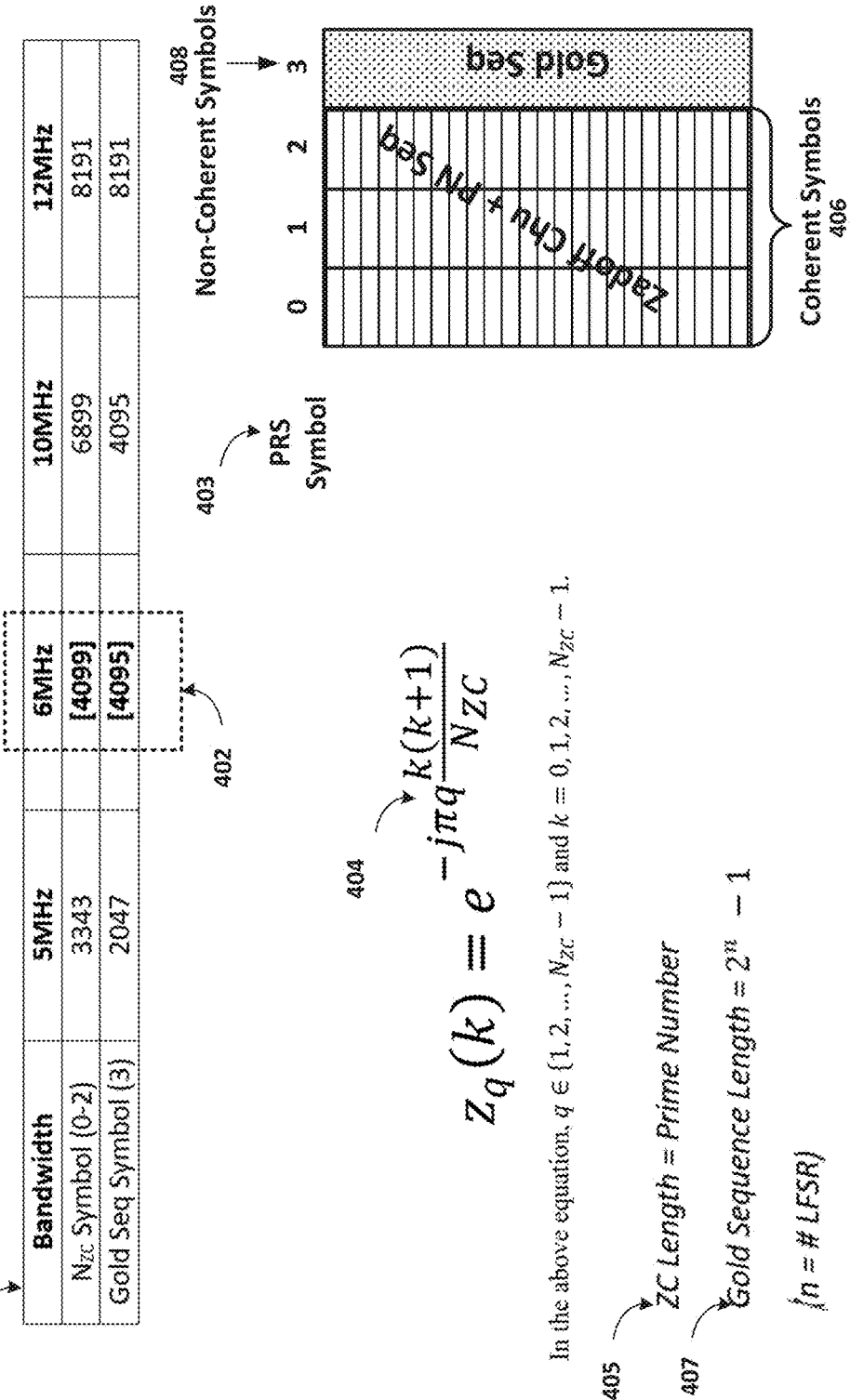
FIG. 4 illustrates various Zadoff Chu sequence lengths and Gold code sequence lengths of various channel bandwidths, for example, 6 MHz bandwidth, in accordance with some embodiments.

FIG. 4 illustrates diagram 400 illustrating Zadoff Chu and Gold sequence lengths 401 for PRS symbols 403 for various bandwidths 402, according to some embodiments. By way of a non-limiting example, the bandwidths can be 5 MHz, 6 MHz, 10 Mhz, or 11 MHz, and preferably 6 MHz bandwidth. The length of a ZC sequence 405 is selected to be a prime number from a set of prime number values. In some examples, the set of prime numbers can include, but is not limited to 3343, 4099, 6899 and 8191. ZC equation 404 shows (q), which is ZC root value, which can be selected to identify the PRS symbol. The length of gold sequence can be represented by equation 407, which can 2n−1, where n is a number of Linear Feedback Shift Register (LFSR). As described above, the PRS symbol 403 is composed of coherent symbols 406 and a non-coherent symbol 408.

Figure 5:
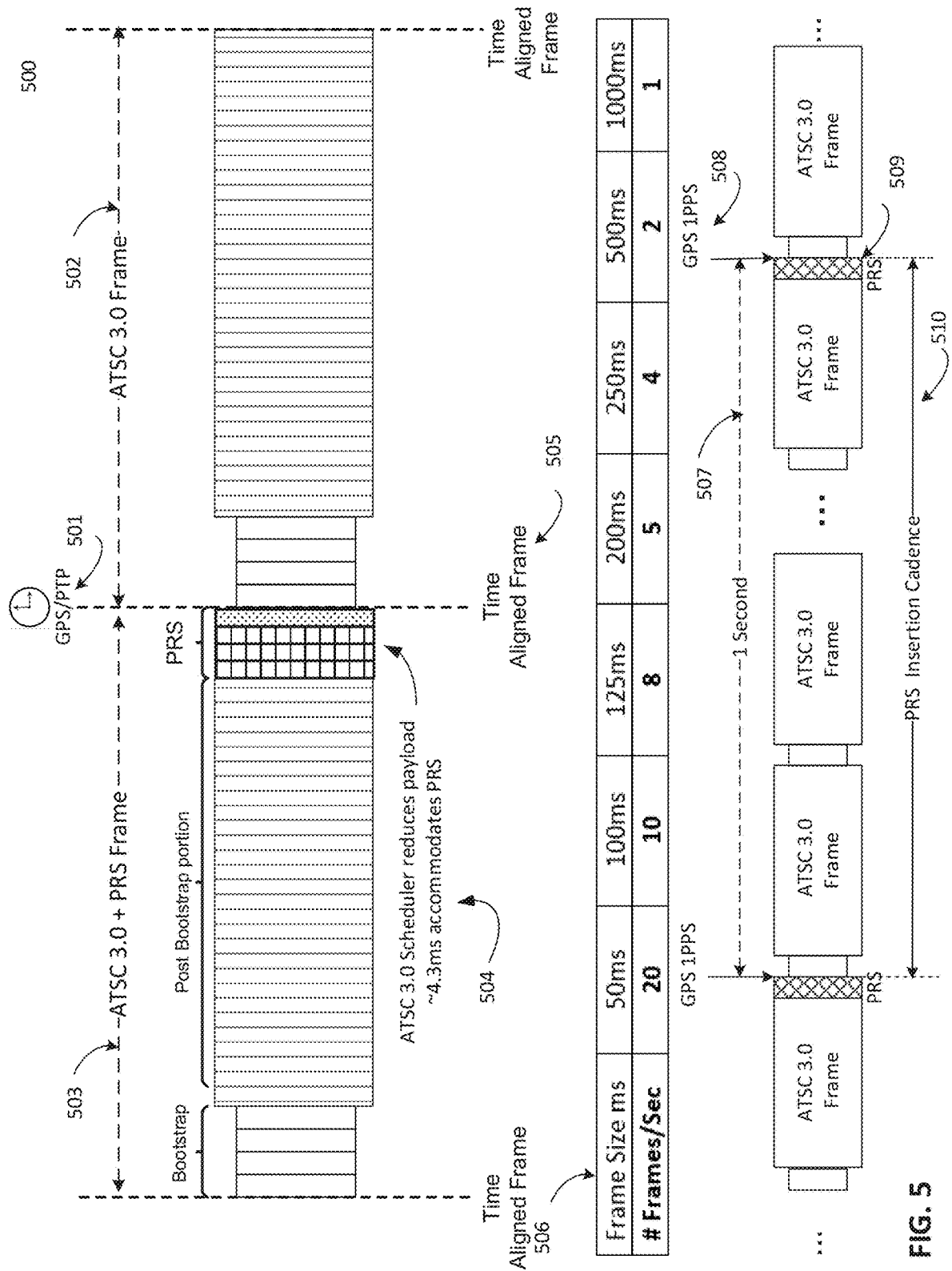
FIG. 5 illustrates ATSC 3.0 frames time aligned with a Global Positioning System (GPS) and frame length selection that result in an integer number of ATSC 3.0 frames in one second and a concept of PRS insertion cadence, in accordance with some embodiments.

FIG. 5 illustrates diagram 500 illustrating information on selection of ATSC 3.0 frame sizes and alignment with GPS to enable deterministic broadcast of a PRS cadence. GPS or PTP 501 is selected as the primary clock reference, which has monotonically increasing second ticks with no leap second insertion. ATSC 3.0 frame 502 is the same length as the ATSC 3.0 frame 503. ATSC 3.0 gateway 109 of FIG. 1 reduces the size of post bootstrap portion of frame to accommodate PRS symbols 504. When time aligned as shown by 505, frames 502 and 503 each has the same lengths and can also be aligned with GPS as discussed using FIG. 16 and FIG. 25 below.

The ATSC 3.0 frame size selection as shown in FIG. 5 as 506 enables an integer number of ATSC 3.0 frames per one second interval 507. This enables a deterministic PRS insertion cadence 509 for the PNT receiver of at least once per second or more frequently 510 if needed. By way of a non-limiting example, the PRS may have an overhead of 0.4% of channel capacity calculated as (4 ms/1000 ms)×100. The frame lengths shown in 506 can change on GPS second ticks 508.

Figure 6:
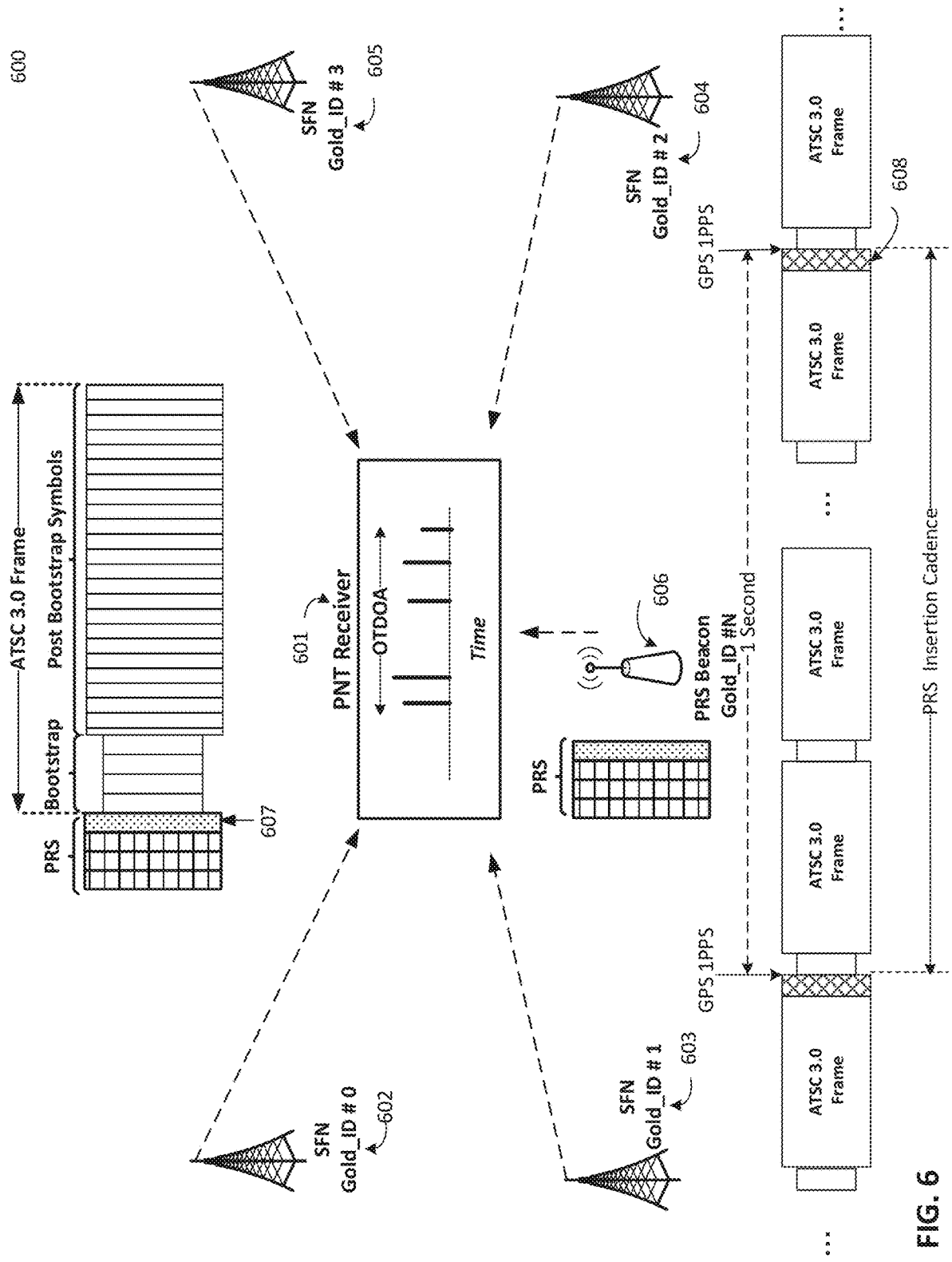
FIG. 6 illustrates exemplary use of PRSs being emitted by four SFN Transmitters and a PRS Beacon transmitter each assigned a unique PRS Gold code sequence for cross-correlation on a PNT receiver to measure arrival time of each PRS Gold code sequence, in accordance with some embodiments.

FIG. 6 illustrates diagram 600 illustrating PNT receiver 601's correlation using the unique PRS Gold code sequences 607, 608 assigned to each SFN transmitter 602, 603, 604, 605 and PRS beacon 606 and detecting the arrival time 601, according to some embodiments. The observed time distance of arrival OTDOA method used to calculate PNT receiver correction using OTDOA mitigates the need for a synchronized clock at PNT receiver 601. The Gold code sequence has cross correlation properties and gain to detect, for example, 10 unique Gold code sequences or SFN transmitters signals arriving at the PNT receiver 601 simultaneously at −10 SNR, as shown using FIG. 14.

Figure 7:
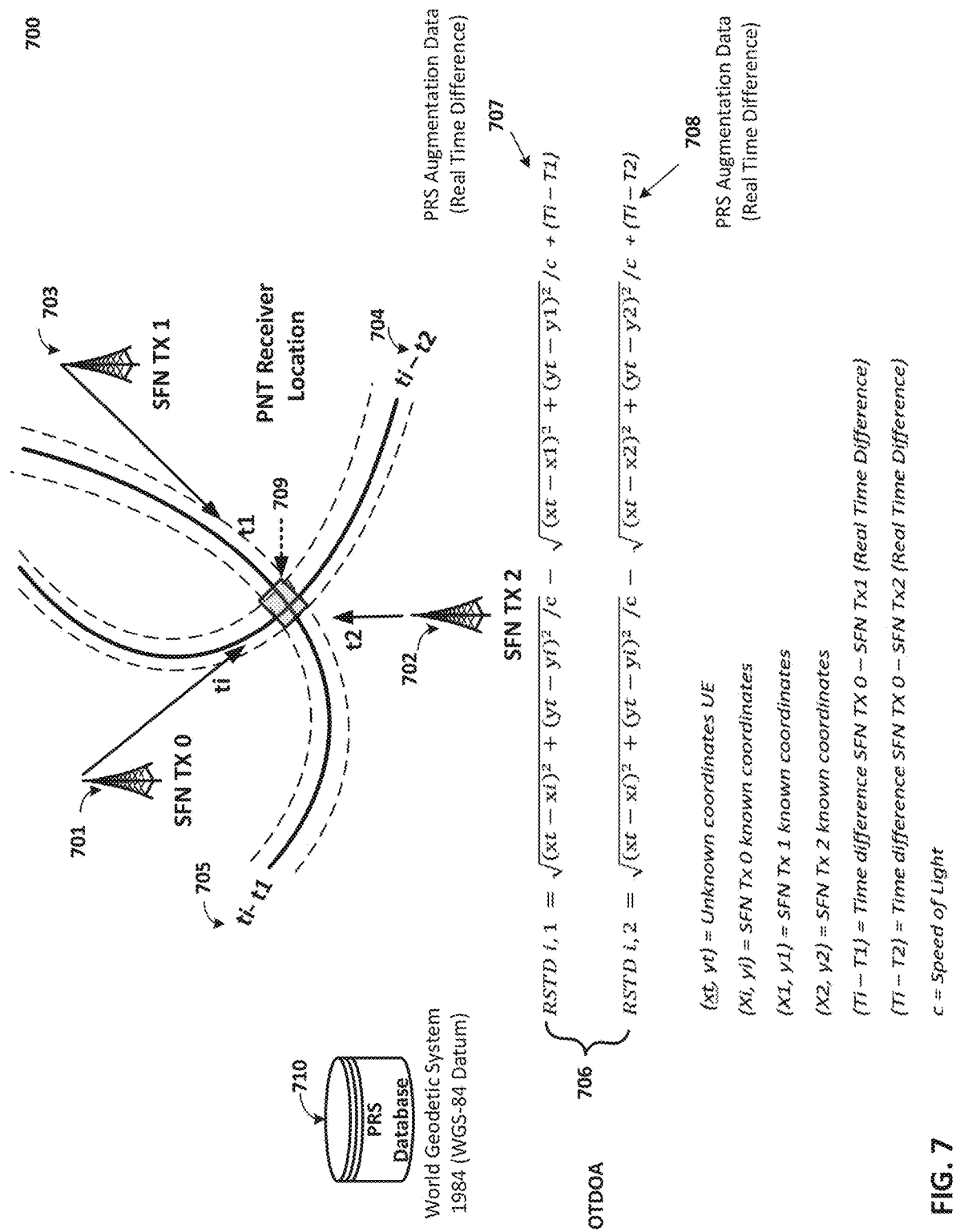
FIG. 7 illustrates an example Observed Time Difference of Arrival (OTDOA) measurement, using multilateration, calculation, and plotting of resulting hyperbolic curves in which an intersect point determines a PNT receiver's two-dimensional (2D) position, in accordance with some embodiments.

FIG. 7 illustrates diagram 700 illustrating observed time difference of arrival OTDOA positioning method that does not require a synchronized clock at a PNT receiver, according to some embodiments. The PNT receiver measures the relative time of arrival of signals from multiple SFN transmitters 701, 702, 703 each assigned a unique Gold code sequence. The coordinates latitude, longitude, and altitude of antenna air interface of the SFN transmitters are known and located in PRS database 710 as World Geodetic System 1984 WGS-84 datum that is used for GPS and Google maps, for example. By way of a non-limiting example, in some cases, only latitude and longitude for each SFN transmitter may be determined.

According to some embodiments, the OTDOA method uses at least three signals and the measured time of arrival using Gold code sequences. One SFN signal is taken as reference (in this example ti from 701), and the reference is measured relative to t1 from 703. Again, ti reference is measured relative to arrival t2 from 702.

The two equations 706 for reference signal time distance RSTD can be used for determining an unknown location of a PNT receiver (xt, yt). The PRS augmentation data 125 of FIG. 1, which has actual measured time offsets 707, 708, are shown being applied to equations 706, which corrects for any timing error at air interface of antenna and effectively removes errors and improves accuracy. At the speed of light c, the SFN RF signals can propagate 1 ft in 1 nanosecond. These two equations from 706 form two hyperbolic curves 705, 704 and where these curves intersect is the correction or the location of PNT receiver 709. PNT receiver 709 can then pass this correction and/or location to upper layer mapping software (e.g., WGS-84) for presentation of location on a map.

Figure 8:
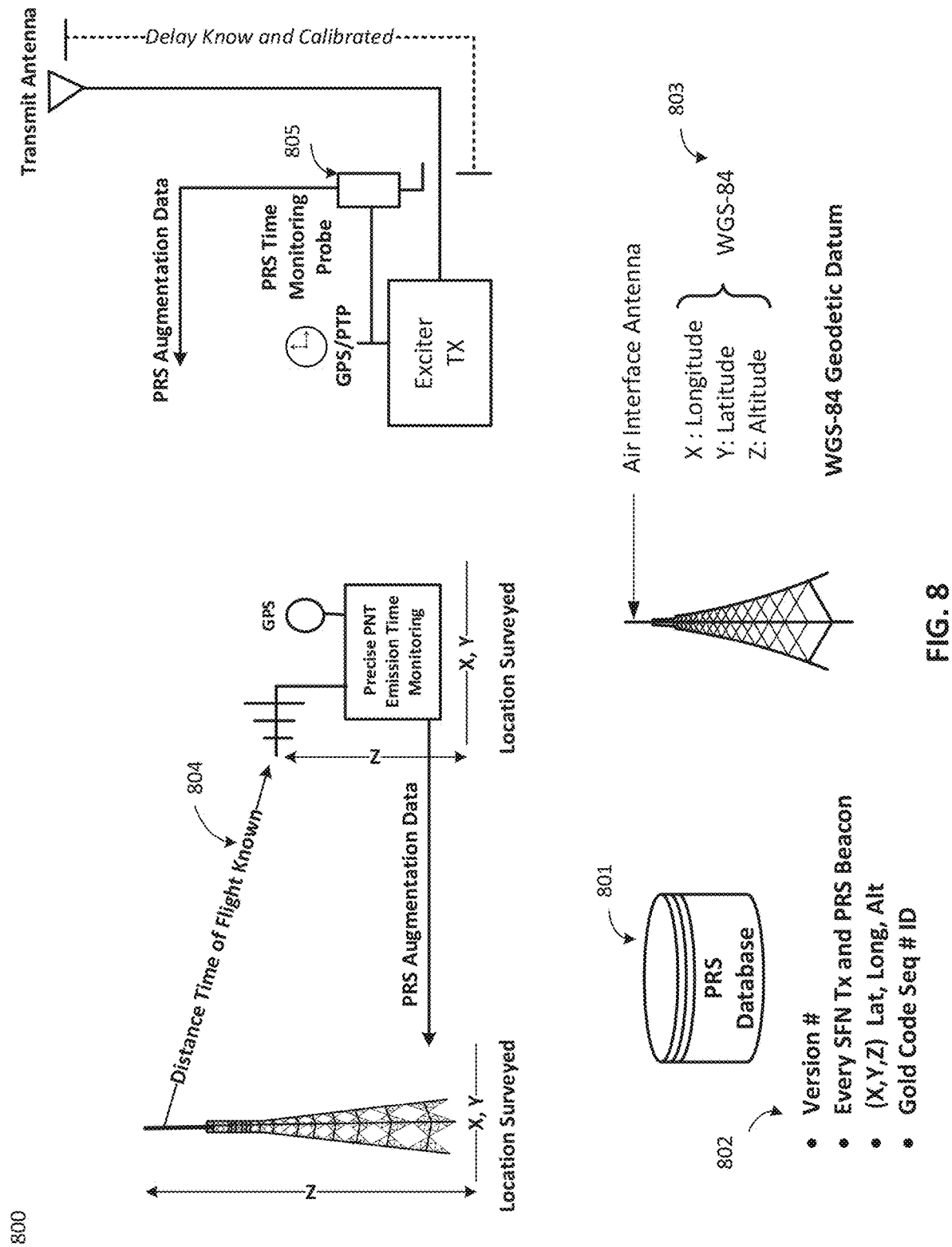
FIG. 8 illustrates examples of enabling or aiding in position accuracy, precise PRS emission time monitoring, PRS database establishment and the demarcation point for emission time measurement of air interface of antenna, in accordance with some embodiments.

FIG. 8 illustrates diagram 800 illustrating data stored in PRS database 801 to support PNT described using FIG. 7 above, according to some embodiments. The longitude, latitude and altitude of air interface of each SFN transmitter and/or PRS beacon is illustrated in WGS-84 datum 803, as one example. The Gold code sequence assigned to each SFN transmitter and PRS beacon transmitters 802 is unique.

The PRS database is available to all PNT receivers by either broadcast or broadband delivery 127. The PRS augmentation data includes the actual measured PRS time offset or errors at antenna air interface. This can be from a precise remote emission time monitoring station or locally generated at a transmitter site by time monitoring probe inserted in transmission line at known point from antenna 805. Both methods 804, 805 send PRS augmentation data to the PNT receiver via broadcast or broadband 122. Given availability of the PRS database and PRS augmentation data, equations 706 can calculate correction or location 709 at the PNT receiver. The PRS beacon is discussed using FIG. 15, which is designed to provide guaranteed emission time once provisioned. The low-cost beacon architecture described using FIG. 15 assists with cold start.

Figure 9:
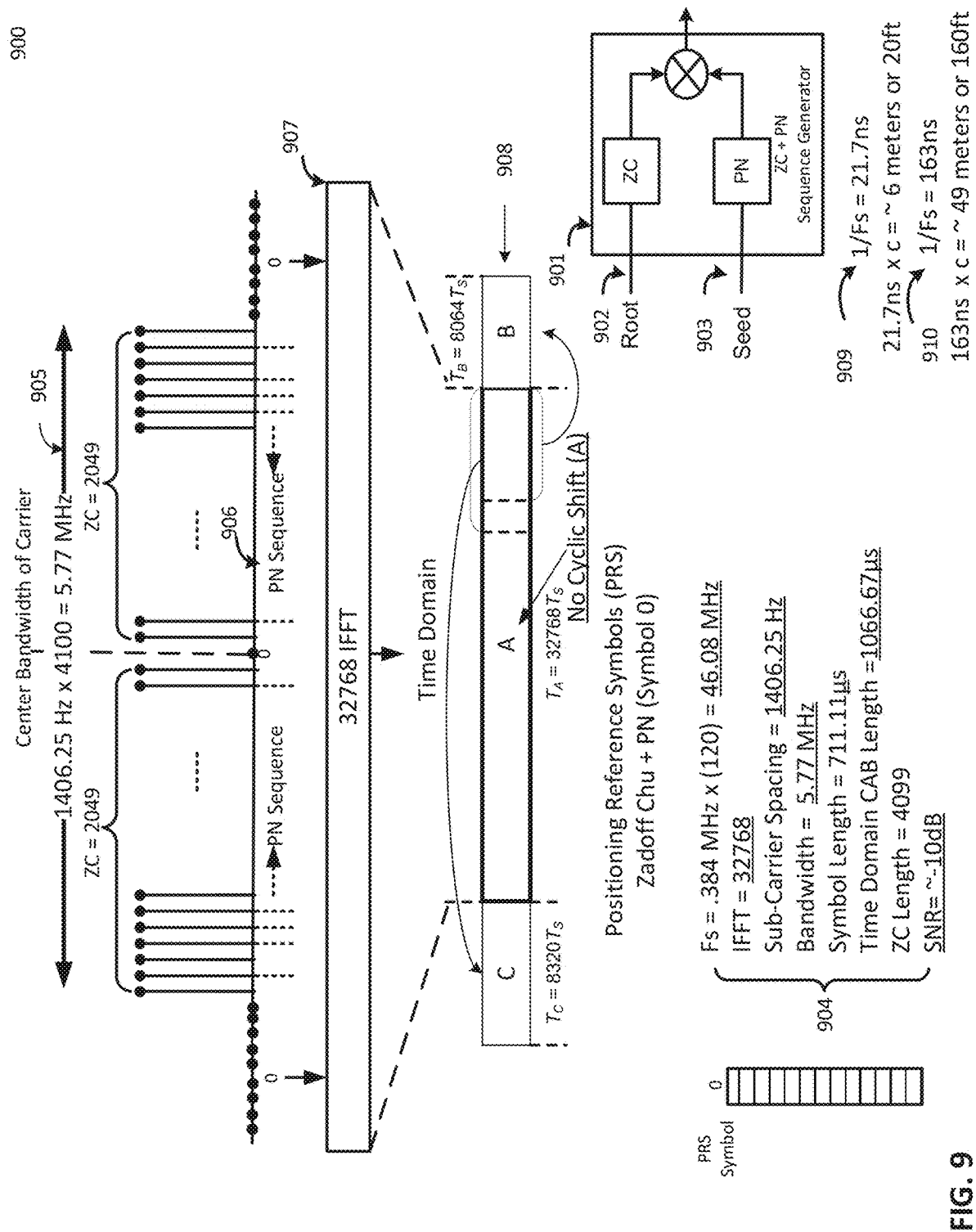
FIG. 9 illustrates the structure and orthogonal frequency-division multiplexing (OFDM) numerology of PRS symbol 0 shown in the frequency and time domains, in accordance with some embodiments.

FIG. 9 illustrates diagram 900 illustrating PRS symbol 0 205 of FIG. 2, which is a ZC and PN 901 used for synchronization and identification of PRS and signaling the time zone of SFN transmitter or PRS beacons, according to some embodiment. By way of a non-limiting example, the ZC root value 902 may have 4098 different root values that can be used for identifying the symbol as PRS and the seed value 903 may have 65536 different seed values used for signaling the time zone 1002 of FIG. 10. The OFDM numerology and other parameters 904 are discussed first and then the PRS symbol 0 structure in frequency and time domains.

In some embodiments, by way of a non-limiting example, the OFDM numerology and other parameters 904 can have the sampling frequency Fs of 46.08 MHz. Accordingly, at the speed of light, the distance the RF signal can travel between sample period can be represented by 1/Fs×c (speed of light) as shown in FIG. 9 as 909, which equates to approximately 6 meters or 20 ft. The ATSC 3.0 A/321 standard not designed for PNT can use a sampling frequency of 6.144 MHz and, accordingly, the distance the RF signal can travel between sample period can be represented by 1/Fs×c as shown in FIG. 9 as 910, which equates to approximately 49 meters or 160 ft. Accordingly, for positioning based services and/or application, a higher value of sampling frequency is desired for higher accuracy.

In some embodiments, by way of a non-limiting example, the total code space for PRS symbol can be represented by (Root×Seed)=4098×65536=268,566,528 codes which can enable a plurality applications since this is analogous to CDMA systems using code domain. The receiver can search for the assigned correlating code value based on (ZC+PN). Accordingly, all others code values can be ignored as noise. By way of a non-limiting example, the symbols with different codes can be inserted in a backward compatible manner in ATSC 3.0 frame as described in the present disclosure.

In some embodiments, by way of a non-limiting example, the IFFT size of 32768 results in OFDM sub-carrier spacing of 1406.25 Hz. In this case, the bandwidth is 5.77 MHz and PRS symbol CAB length is 1066 μs, the ZC length is 4099 compared to ZC length 1499 for A/321 having +4 dB advantage SNR.

In some embodiments, by way of a non-limiting example, in the frequency domain, the PRS ZC length 4099 is centered in channel bandwidth 905 with 2049 sub-carrier above and 2049 sub-carriers below the center of channel which has sub-carrier set to zero. The PN sequence 906 is applied to ZC in frequency domain to improve cross correlation. The PRS symbol 0 is converted to time domain using 32768 IFFT 907. The symbol 0 in time domain A portion has 32768 samples from IFFT, then a C portion is created using 8320 samples of A as a prefix and a B portion is created using 8064 samples of A as a postfix shown forming a CAB symbol structure 908 in the time domain. The PRS symbols 0, 1, 2 all are structured from ZC and PN sequences. However, to enable the PNT receiver to find the start of the PRS symbol, symbol 0 has the CAB structure in the time domain. The PRS symbols 1, 2 can use a BCA structure in the time domain. By way of a non-limiting example, the A portion of CAB symbol 0 may not use cyclic shifts for signaling. However, the A portion of CBA symbol 1, 2 may use cyclic shifts for signaling as shown using FIG. 12.

Figure 10:
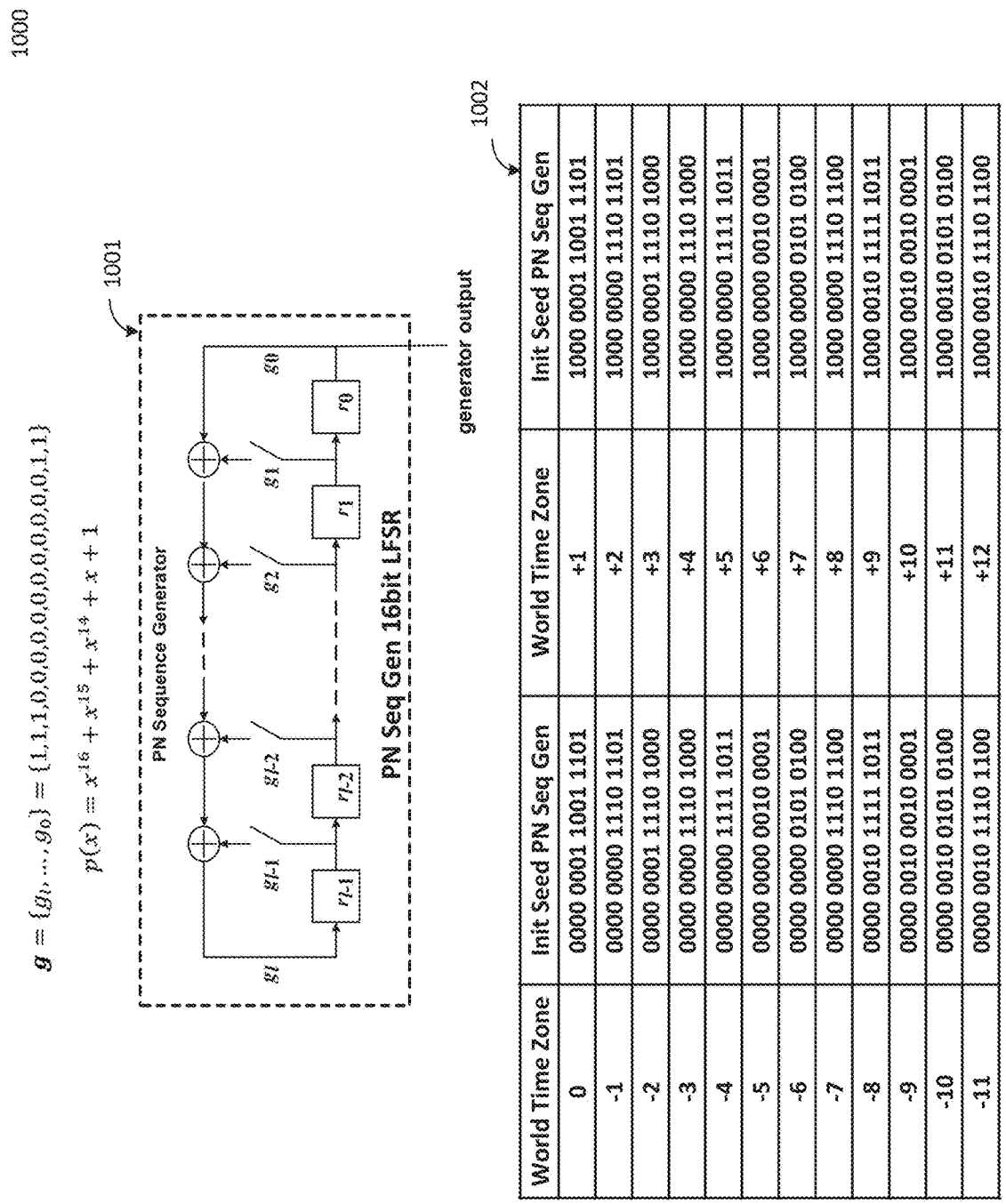
FIG. 10 illustrates structure of linear feedback shift register (LFSR) used in a Pseudo-Noise (PN) Sequence generator of PRS symbol 0 that can be used to signal the world time zone location of SFN Transmitters and PRS Beacon transmitters, in accordance with some embodiments.

FIG. 10 illustrates diagram 1000 illustrating more details of PN sequence generator part of 901, according to some embodiments. As shown in FIG. 10, the PN sequence generator can have a 16 bit linear feedback shift register LFSR 1001. Table 1002 shows 24 of the possible 65536 initialization seeds that can be used as seed 903 for signaling the world time zone location of the transmitter. Each transmitter in a particular time zone uses a specific seed as shown by 1002, which is discussed in detail below. By way of a non-limiting example, the Gold code sequence used for identifying a transmitter can be unique in each time zone. Accordingly, the Gold code sequence can be reused across various time zones.

Figure 11:
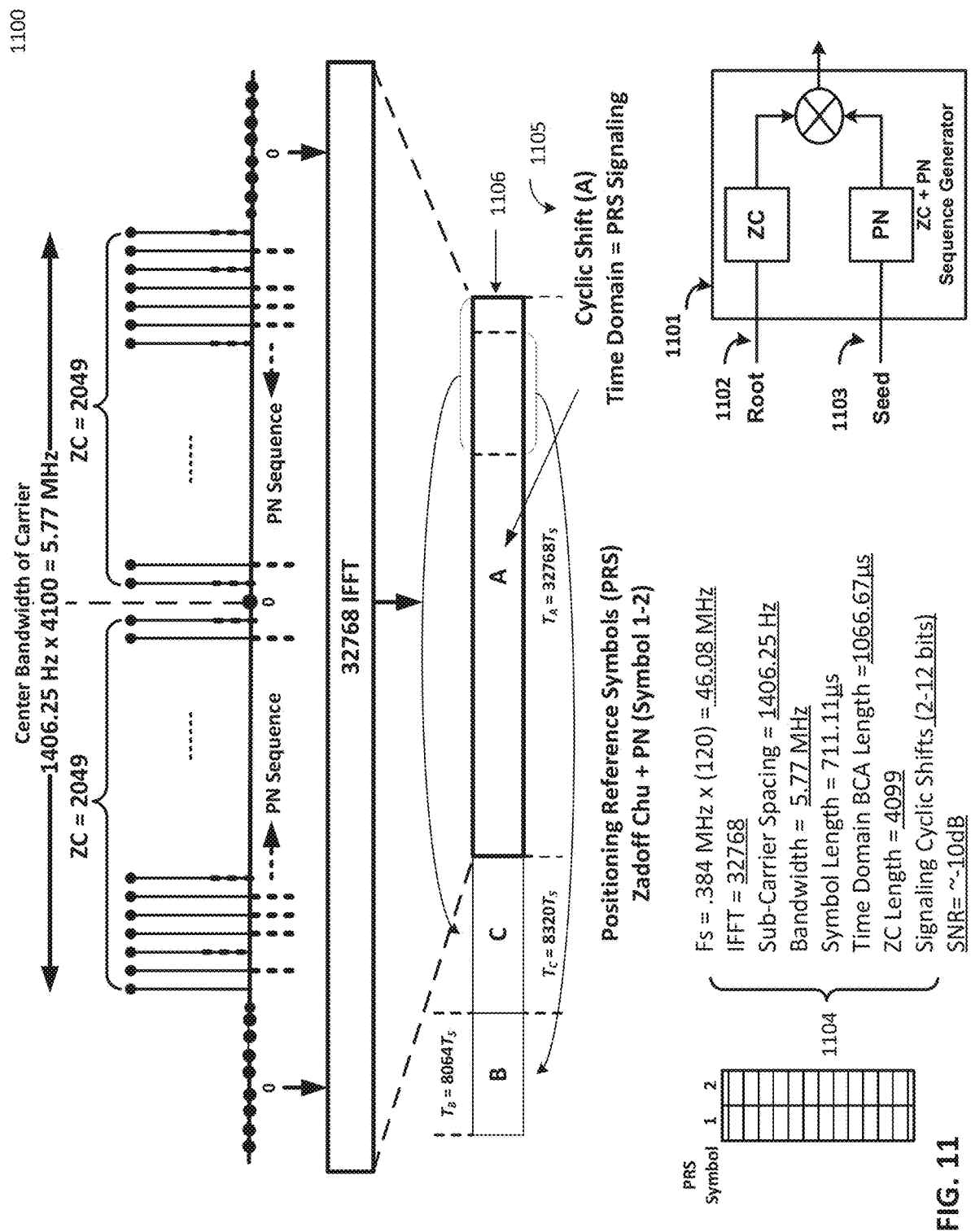
FIG. 11 illustrates the structure and OFDM numerology of PRS symbol 1 and PRS symbol 2 used for signaling in the frequency and time domains, in accordance with some embodiments.

FIG. 11 illustrates diagram 1100 illustrating PRS symbol 1 206, symbol 2 207 generated by a ZC and PN sequence generator 1101, according to some embodiments. The PRS symbol 1 and symbol 2 are used for signaling of information to support PNT and/or other services. The ZC root value 1102 is same as 902 as discussed earlier using FIG. 9, and the seed value 1103 is same as 902 as discussed earlier using FIG. 9. In comparison to FIG. 9, FIG. 11 describes PRS symbols in time domain 1105. As shown in FIG. 11, the cyclic shifts are applied to portion A of the BCA 1106 to signal 2-12 bits of information to PNT receiver. The PN sequence added to ZC increases cross correlation performance of the (ZC+PN) sequence generator 1101.

As shown in FIG. 11 as 1104, by way of a non-limiting example, the sampling frequency Fs can be 46.08 MHz, the IFFT size can be 32768, sub-carrier spacing can be 1406.25 Hz, bandwidth can be 5.77 MHz, the total length of BCA can be 1066.67 μs, ZC length can be 4099. Further, 2-12 bits per symbol can be signaled via cyclic shifts for robust SNR at a receiver.

In some embodiments, by way of a non-limiting example, the PRS symbol 1 and symbol 2 can be converted to time domain using 32768 IFFT. In the time domain A portion has 32768 samples from IFFT, then a C portion is created using 8320 samples of A as a prefix and a B portion is created using 8064 samples of A as a prefix as shown forming a BCA symbol structure 1106 in the time domain, which is different than CAB 908 by design as previously mentioned to enable PNT receiver to find CAB 908 and the start of the PRS symbol.

In some embodiments, by way of a non-limiting example, the 32768 samples of A portion 1106 can signal up to $\log_2$(32768) or 15 bits via cyclic shifts in time domain. For comparison A/321 standard OFDM numerology can signal up to $\log_2$(2048) or 11 bits via cyclic shifts in time domain. By way of a non-limiting example, to increase error tolerance, in A/321 8 bits or 256 cyclic shifts can be gray coded. The PRS will use between 2-12 bits or 4 to 4096 cyclic shifts that are Gray coded to have range of error tolerances and capacity as will be discussed using FIG. 12.

FIG. 12 illustrates diagram 1200 illustrating an example of portion A of BCA 1106 using 256 cyclic shifts to signal 8 bits of information that is Gray coded to increase error tolerance, according to some embodiments. The 256 cyclic shifts for 8 bits 1202 in example are Gray coded using equation 1201 to increase error tolerance 1203. The tables 1204a, 1204b show same results of the 8 bits or 256 cyclic shifts that is using Gray coding. The 1204a shows signaling bits in ascending order and 1204b shows 256 cyclic shifts in decimal in ascending order showing power value of the Gray coding to increase error tolerance. As shown in FIG. 12 by 1203 by using Gray coding, each of the 256 cyclic shifts is separated by 128 samples in the time domain.

In the example shown in FIG. 12, to signal 8 bits using Gray coding, the PNT receiver can use a copy as a lookup table, as shown by 1204b, to test for each cyclic shift using correlation at the receiver. When correlation is detected, and cyclic shift identified, the reference to table 1204b can indicate the 8 bits signaling values in binary, which can be given semantic meaning for the application, i.e., PNT, etc. The error tolerance 128 can be in range of +/−64 samples detected of a value shown in 1204b and return the same 8-bit value using Gray coding. By increasing number of signaling bits, error tolerance can be lowered or by decreasing number of signaling bits a error tolerance can be increased. For a larger error tolerance using less signaling bits to signal important emergency alerts to public, more robustness can be guaranteed and a probability of a false trigger can be reduced.

Figure 13:
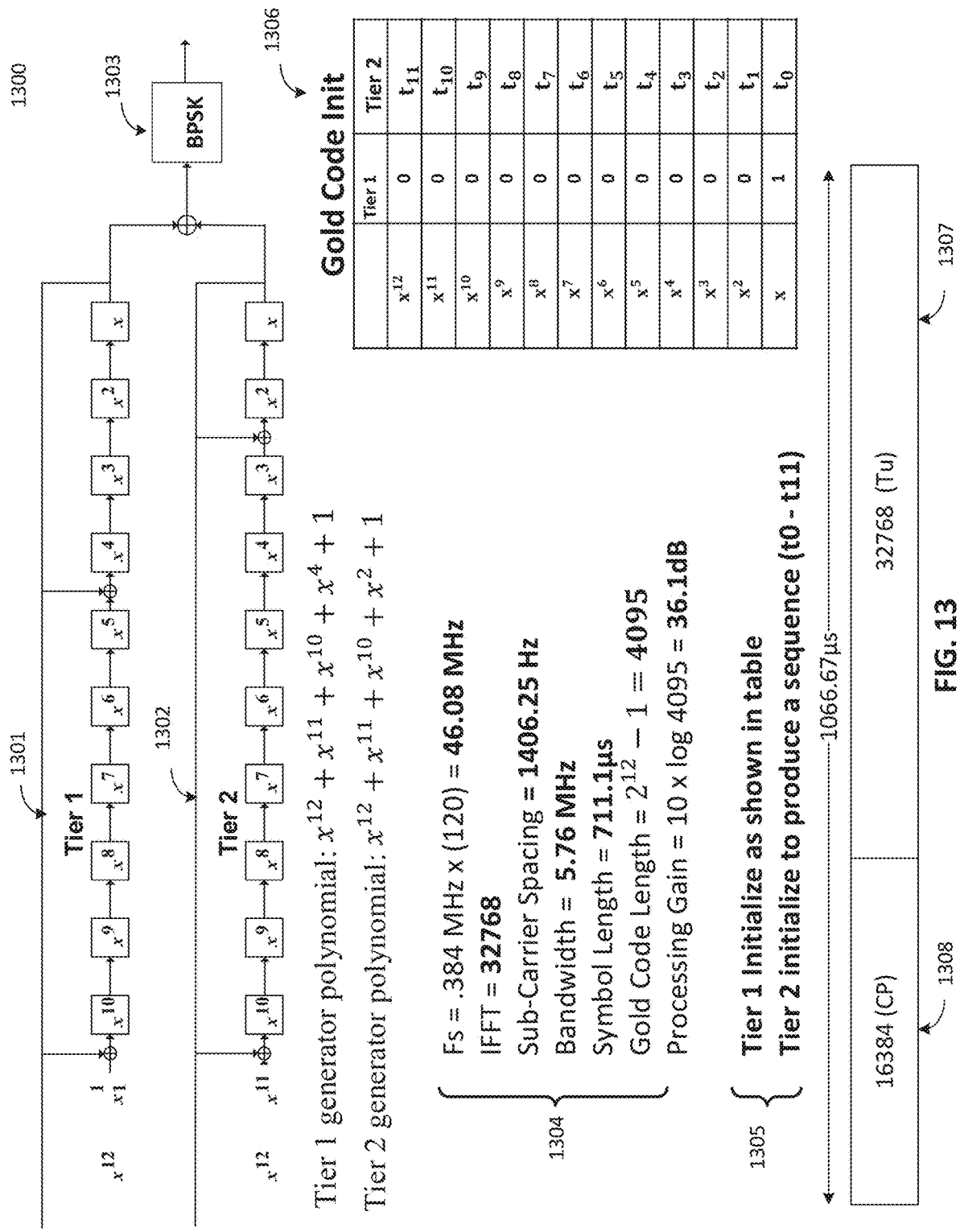
FIG. 13 illustrates Gold code sequence generator and initialization table for selecting different Gold code sequences and the OFDM numerology of PRS symbol 3, in accordance with some embodiments.

FIG. 13 illustrates diagram 1300 illustrating PRS symbol 3, 208 which is a Gold code sequence created from a preferred pair of sequences of length m 1301, 1302 that are combined to generate an output that is BPSK modulated 1303, according to some embodiments. The 1301 is termed Tier 1 m sequence and its generator polynomial is shown, 1302 is termed Tier 2 m sequence and its generator polynomial is also shown.

In some cases, by way of a non-limiting example, both m sequences 1301, 1302 can be composed of 12 linear feedback shift registers LFSR and produce a gold sequence of length $4095=2^{12}-1$.

The tier 1 and tier 2 sequences are initialized using table 1306. The tier 1 initiation 1305 is fixed but tier 2 initialization values can be selected to create 4095 unique Gold code sequences to be used as a PRS symbol 3 for a PNT receiver to correlate and detect arrival time of up to 4095 unique SFN transmitters and/or PRS beacons, which can be assigned a unique Gold code sequence 1 of 4095 and stored in the PRS database 127.

The OFDM numerology and other parameters for Gold code sequences in accordance with some embodiments is shown as 1304. The sampling frequency Fs can be 46.08 MHz, the IFFT size can be 32768, sub-carrier spacing can be 1406.25 Hz, for example. The Gold code sequence length is 4095 with a processing gain 1304 of 36.1 dB.

The PRS symbol 3 length is 711.1 µs as shown in time domain as 1307. When a Cyclic Prefix length 1308 of 355.6 µs is added, the PRS symbol 3 can have a total length of 1066.67 µs which is same as the length of PRS symbols 0, 1, 2.

The ATSC 3.0 standard A/322 defines an optional transmitter identification signal using a length N=8191 Gold code sequence that is buried as a RF watermark up to −45 dB in power on ATSC 3.0 preamble (host) symbol. The transmitter identification signal is primarily used for measuring the relative amplitude and timing delays between SFN transmitters. Used primarily as a tool for SFN transmitter provisioning and monitoring SFN operation by broadcast engineers. The two major shortcomings of the A/322 transmitter identification signal method if used for positioning and geo-location is the sample frequency FS of 6.912 MHz and injection as a RF watermark up to −45 dB below the host or preamble symbol in A/322.

It should be appreciated that the method described herein can be optimized explicitly for positioning and geo-location services. The method as described herein in accordance with some embodiments cause a Gold code sequence of 4095 length with a sampling frequency Fs of 46.08 MHz, with a Gold code sequence symbol transmitted at full power and not buried as RF watermark for providing signaling to support geo-location application services. Thus, it is backward compatible with ATSC 3.0 A/321 and A/322 standards with the optional transmitter identification RF watermark.

Figure 14:
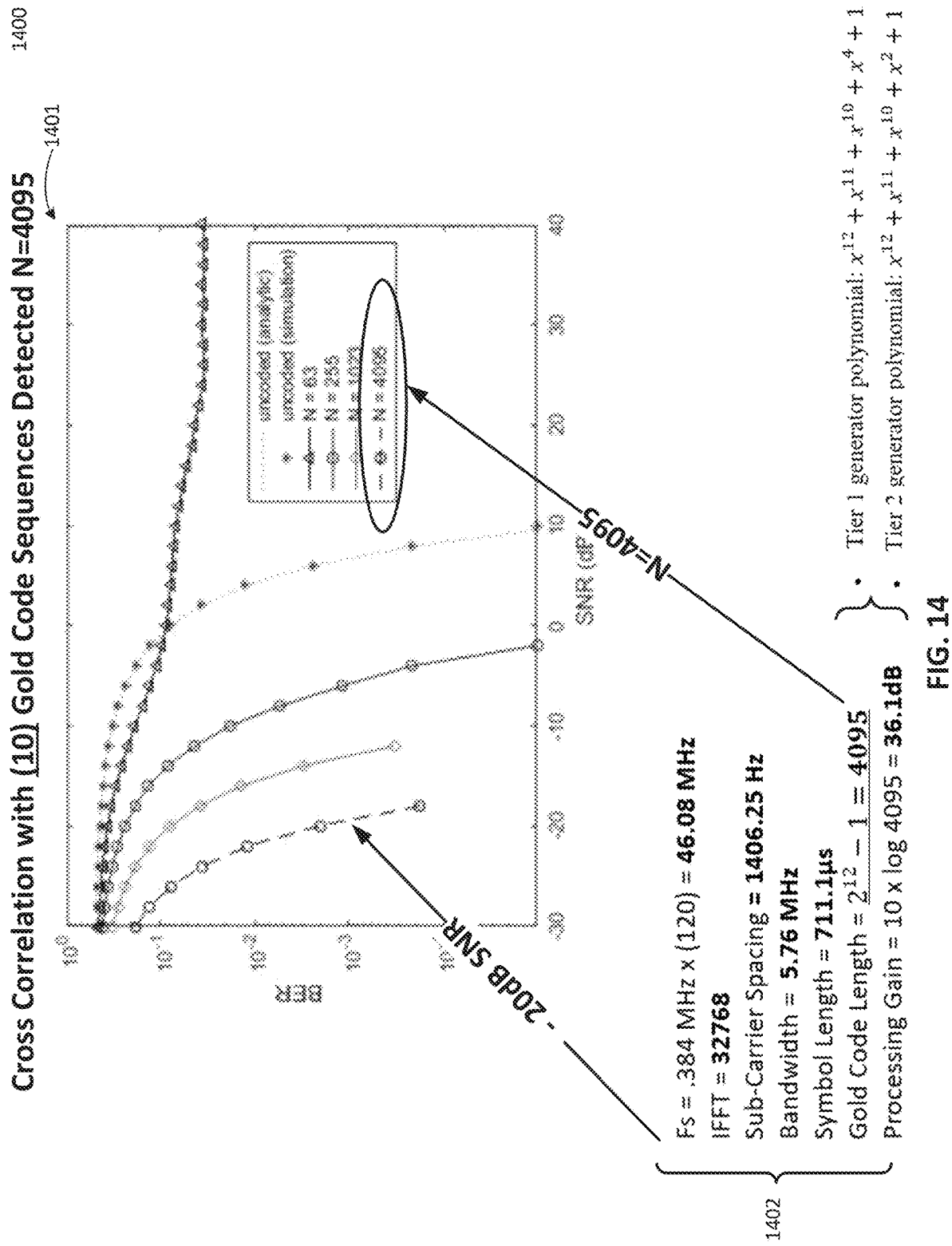
FIG. 14 illustrates example of cross correlation performance of Gold code sequence length (N=4095) for simultaneously detecting 10 different SFN Transmitters unique PRS Gold code sequences arriving simultaneously, in accordance with some embodiments.

FIG. 14 illustrates diagram 1400 illustrating cross-correlation performance of PRS symbol 3 of FIG. 13, according to some embodiments. The OFDM numerology and parameters are shown 1402 are shown for length 4095 Gold code sequence. The simulation 1401 shows 10 unique Gold code sequences of SFN transmitters and PRS beacon transmitters that can simultaneously be detected for the length 4095 Gold code sequences at −20 dB SNR robustness.

In some embodiments, using PRS symbol 3, a large constellation of SFN transmitters and or PRS beacons transmitters each assigned a unique Gold code sequence can be simultaneously detected by a PNT receiver and channel impulse response (CIR) of each is used to determine time of arrival for OTDOA. Other advantages of broadcasting the PRS symbol(s) is RF propagation physics in broadcast band and the high-power signals emitted by SFN transmitters, for example, a 50-100 kW effective radiated power (ERP) SFN transmitter that is located much closer to the PNT receiver and not 20,200 km in space like GPS satellites. And PRS can be detected at −20 dB SNR. For ATSC 3.0 broadcast, power limit set by FCC in USA is 1 MW ERP and maximum tower height is 2000 ft.

Figure 15:
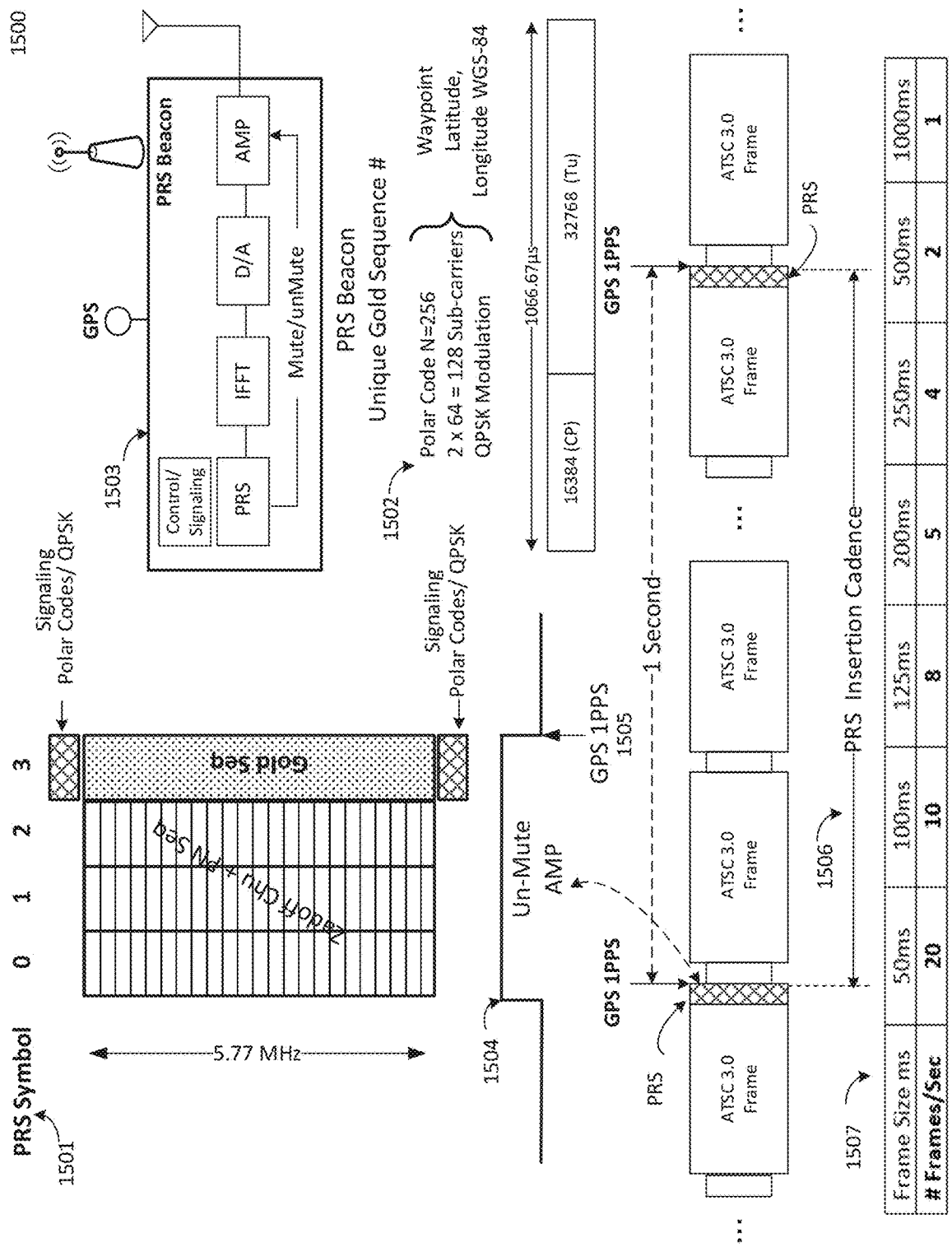
FIG. 15 illustrates an example of unique PRS structure and the block of PRS Beacon transmitter locked to GPS, in accordance with some embodiments.

FIG. 15 illustrates diagram 1500 illustrating information of a PRS Beacon transmitter 1503, according to some embodiments. The similarities and unique differences to a SFN transmitter are discussed to increase understanding of these low-cost PRS beacon transmitters that can be easily deployed outdoors or inside building and malls, etc. to enhance or enable PNT services.

The PRS symbols 1501 for PRS beacon transmitter are shown. The same ZC and PN coherent symbols 0, 1, 2 and non-coherent symbol 3 Gold code sequences are used as discussed 900, 1100, 1300.

In some embodiments, by way of a non-limiting example, the main difference is that the new signaling 1502 added in frequency domain on band edges of symbol 3 is using Polar codes and quadrature phase shift keying (QPSK) modulation. Polar codes have excellent performance for short code lengths and have been adopted by 3GPP for 5GNR control signaling and can be used for PRS beacon signaling of "Waypoint" to aid cold start of PNT receiver and achieve first fix as will be discussed. The polar code length of N=256 can signal the waypoint using 48-64 bits and has a robustness ~0 dB SNR.

In accordance with some embodiments, the need for PRS beacon signaling is discussed below. It is assumed that each PNT receiver is coupled to or has a copy of PRS database 801, which includes the WGS-84 datum coordinates 803 a plurality of SFN transmitters and/or PRS beacon transmitters and the unique Gold code sequences assigned to each of the SFN transmitter and/or PRS beacon transmitter.

In accordance with some embodiments, when the PNT receiver is just turned on, for example, cold start, or a person has just landed on a plane in a different city, the waypoint can be used to determine which Gold code sequences to search for and coordinates of SFN transmitters and/or PRS beacons to use at the new location.

In accordance with some embodiments, a cold start PNT receiver can find PRS symbol 0, and synchronizes and discovers the time zone of transmitter sending the PRS beacon. The PRS beacon transmitter signaling 1502 is decoded and a waypoint or latitude, longitude using WGS-84 datum of current general location is received by the PNT receiver.

Since a PRS beacon transmitter is low power and its signal cannot propagate great distances the waypoint 1502 can be used by PNT receiver to access the PRS database and determine possible Gold code sequences to try correlating to identify SFN transmitters and other beacons available at current location for the cold start. By way of a non-limiting example, a user can also enter current address and zip code and a lookup in PRS database during cold start.

The PNT receiver using waypoint during cold start and OTDOA then obtains a first fix and its location becomes known and the position can then be tracked in PRS database as PNT receiver moves in environment to discover other SFN transmitters and PRS beacons transmitters, etc. Other methods to assist cold start are discussed using FIG. 17.

Referring to PRS beacon transmitter 1503, the PRS 1501 is only broadcast by beacon transmitter 1503 and not by SFN transmitters and GPS is used as primary clock reference as shown 1503. The PRS beacon is controlled and provisioned as to the ATSC 3.0 frame size 1505 and insertion PRS cadence 1506 is used, which matches SFN frequency. The GPS 1PPS 1505 is shown aligned beginning of bootstrap 202 (not shown). The PRS beacon transmitter can insert 1501 and un-mute amp 1503 and broadcast only PRS 1501 cadence in a deterministic fashion. Accordingly, once exact location of PRS beacon is determined and entered into the PRS database 801 with the assigned Gold code sequence and GPS 1PPS and has AC power available, the PRS Beacon transmitter can emit 1501 as part of SFN in outdoors or indoor locations to support geo-location services. Three (3) different PRS are required for a PNT receiver's 2D fix from a combination of SFN transmitters and/or PRS beacons transmitters.

Figure 16:
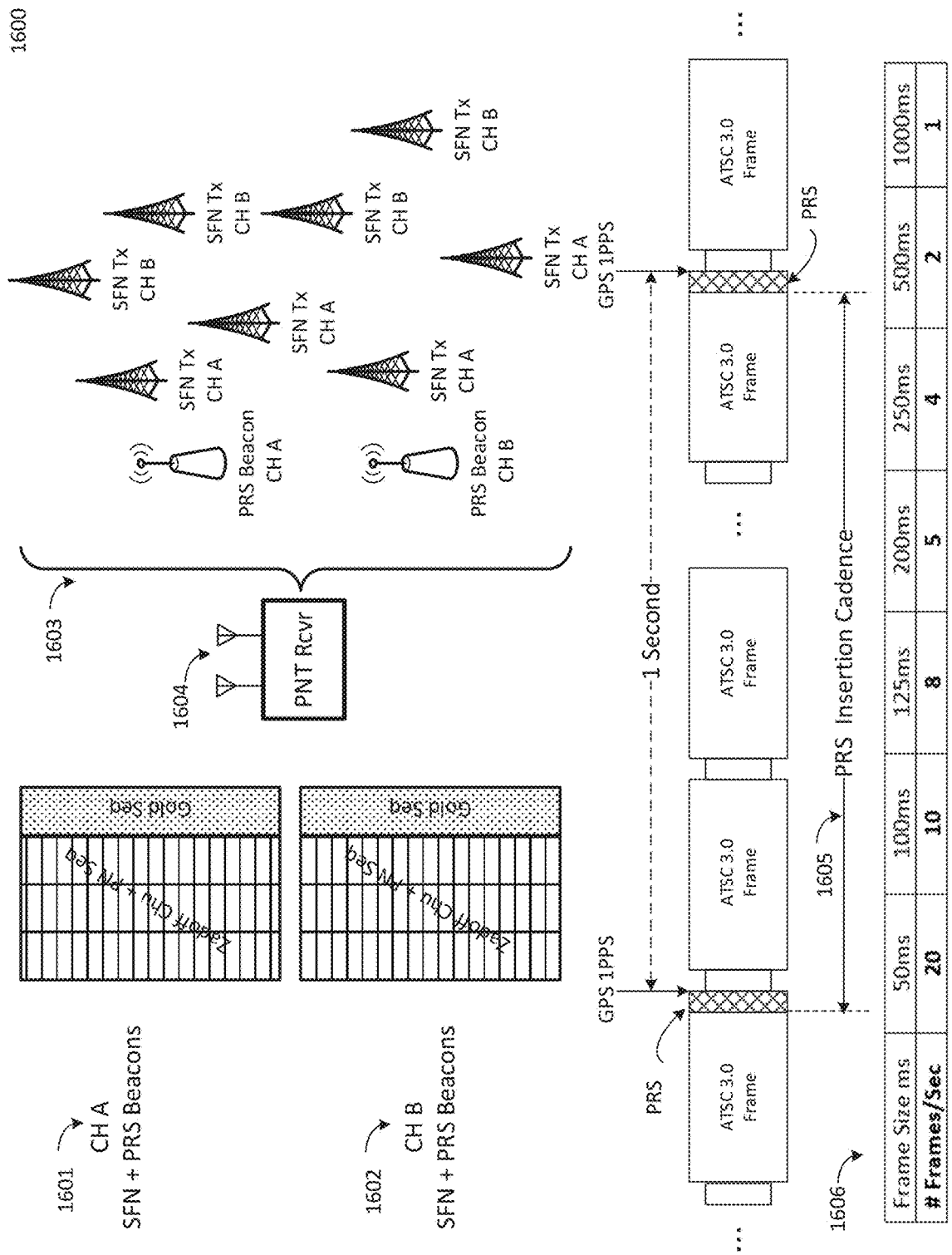
FIG. 16 illustrates example PNT diversity receiver including two RF tuners simultaneously receiving PRS from SFN channel (CH) A and SFN channel (CH) B, and PRS Beacons to increase the number of PRS transmitters available to increase PNT reliability, in accordance with some embodiments.

FIG. 16 illustrates diagram 1600 illustrating an example of PNT diversity to increase constellation size or the number of SFN transmitters and PRS beacons transmitters available at the PNT receiver to increase service reliability, according to some embodiments. In FIG. 16, a SFN on CH A (frequency) with SFN and PRS beacon transmitters 1601, and a SFN on CH B (frequency) with SFN and PRS beacons 1602 are shown. Both SFN transmitter signals and PRS beacon transmitter signals 1603 are shown arriving at PNT receiver 1604 with two tuners. By way of a non-limiting example, each tuner of the PNT receiver 1604 can be used for PNT diversity for a different SFN frequency, for example, the SFN on CH A 1601, the SFN on CH B 1602.

Given that the frame size 1606 and PRS insertion cadence 1605 are the same for the two SFN frequencies 1601, 1602, SFN frequencies 1601, 1602 can simultaneously be received by the PNT receiver 1604. Further, using PRS database 801 and having a larger constellation of Gold code sequences to choose from at the PNT receiver 1604, as the PNT receiver 1604 moves in the environment, it can improve service reliability.

Both the GPS and Local Positioning with PRS measure Time of Arrival (TOA) of a signal and depend on having Line of Sight (LOS) signals from numerous satellites or SFN transmitters for best accuracy. However, the constraints and strengths of these two positioning systems are quite different. Both systems require receiver algorithms for detecting LOS and mitigating multipath, etc., and a larger constellation of satellites or terrestrial transmitters. The advantages of local positioning using PRS is discussed using FIG. 23.

Figure 17:
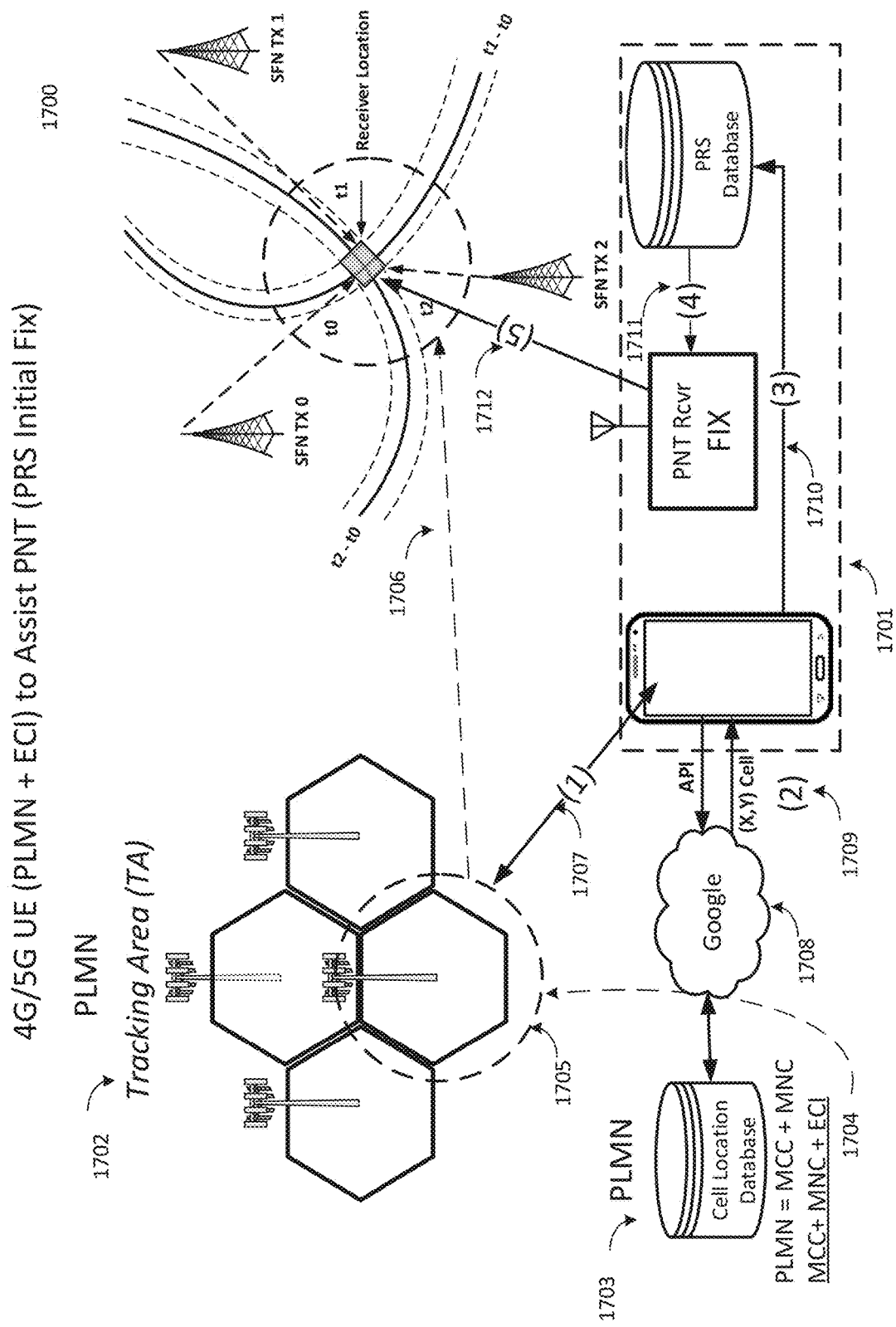
FIG. 17 illustrates a 4G system or a 5G system assisting a broadcast PNT receiver to determine general location (cold start) for accessing PRS database to achieve PRS first fix in case 4G or 5G and broadcast are all available on the same user equipment (UE), in accordance with some embodiments.

FIG. 17 illustrates diagram 1700 illustrating using 4G or 5G systems to assist PRS receiver 1701 during cold start and initial fix assuming that PRS receiver 1701 has 4G or 5G wireless and broadcast PNT Capabilities, according to some embodiments. This is based on the fact that 4G or 5G establishes tracking areas TAs inside network 1702 and define a serving cell in the TAs for each UE. The general location of UE in a TA is known by 4G or 5G network so UE can be paged and receive incoming calls or SMS from the network, etc.

Globally, every PLMN (physical land mobile network) is identified by a unique mobile country code MCC+MNC mobile network code, a unique ID for each operator inside country. Each base station is identified by ECI cell identifier as shown by 1704 in FIG. 17. Every cell latitude, longitude can be stored in a database 1703. Generally the distance of UE 1705, 1706 from a serving cell is on average ~1-2 km and this general location of serving cell can provide initial assistance to the PRS receiver during the cold start and then to achieve initial fix.

The UE knows PLMN and serving cell ECI 1707 to which the UE is currently attached. This information is passed via API call to a service, such as, but not limited to, Google 1708 which returns (x, y) location 1709 of cell in WGS-84 datum. The (x, y) location 1710 is sent to PRS database of the PNT receiver 1701 and used to suggest the Gold code sequences, etc., of potential transmitter signals at this general location to use by PNT receiver to correlate and achieve a first fix 1712 and determine PNT receiver position.

When fix is obtained, the location becomes known and position can then be tracked in PRS database as PNT receiver moves in the environment. Thus, the PRS database is used to discover other SFN transmitters and PRS beacons transmitters, etc.

Figure 18:
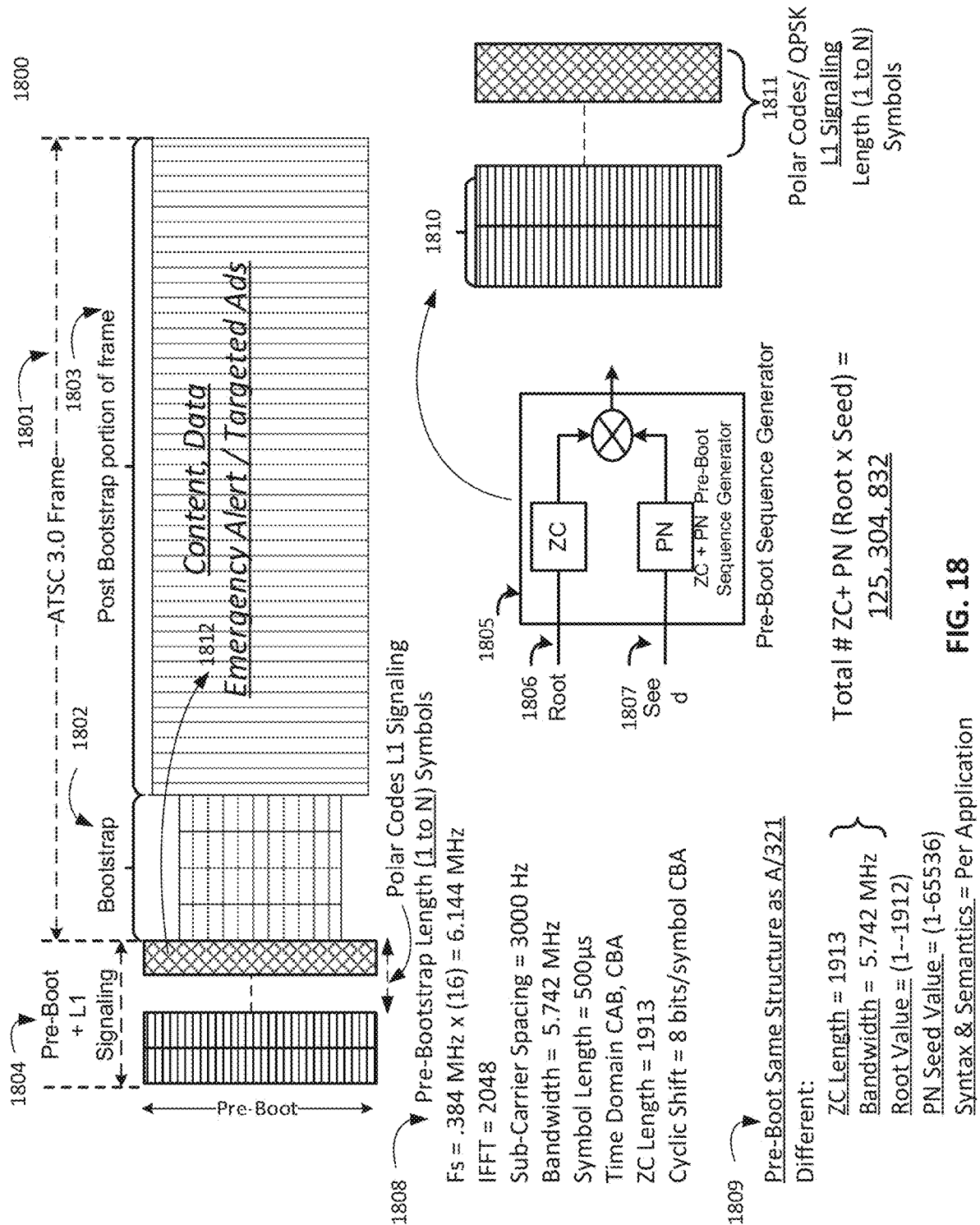
FIG. 18 illustrates an example of the structure and OFDM numerology of the pre-boot symbols and Layer 1 (L1) signaling used with device based geo-fencing alerts and/or targeting ads, in accordance with some embodiments.

FIG. 18 illustrates diagram 1800 illustrates example of pre-boot and L1 signaling symbols 1804 used to support device-based geo-targeting services using PRS 500 and/or other use cases such as IoT, etc. based on pre-boot symbols (1 to N) 1808 and the L1 signaling symbols (1 to N) 1811. The pre-boot and L1 signaling symbols 1804 is prepended to the time aligned ATSC 3.0 frame 1801 that includes bootstrap 1802 and post bootstrap portion 1803 as shown in the PRS 500.

In some embodiments, signaling 1811 can be used for directing a UE in device-based geo-targeting after receiving an emergency alert via PRS signaling 1200 and/or targeting ads using geo-fencing to quickly find the associated emergency alerting information data and/or targeting information carried in the broadcast 1812 in the post bootstrap portion of the frame 1803.

The pre-boot sequence generator 1805 is composed of a ZC sequence (that is generated based on root value 1806) and a PN sequence (e.g., a 16-bit PN sequence that is generated based on seed value 1807). The OFDM numerology of pre-boot symbols 1808 is shown and is aligned with A/321 bootstrap with the differences shown in 1809. In some examples, ZC length=1913, bandwidth=5.742 MHz, root value 1806 and seed value 1807 are selected per application, in a backward compatible manner.

In some embodiments, the signaling syntax and semantic is defined per the application and with possible code space of (root×seed) values ~98 million this CDMA structure 1808 can be seen as generic and reusable per the application, with many possible applications supported concurrently. The signaling syntax and semantics can be explicitly defined for each application. Both the placement in the frame and L1 signaling from ATSC 3.0 can make pre-boot and L1 signaling symbols 1804 agnostic and backward compatibility. Future devices will be capable of both ATSC 3.0 and the new services announced by pre-boot and L1 signaling symbols 1804.

The final (1 to N) symbols 1811 of pre-boot and L1 signaling symbols 1804 are used for L1 signaling and use polar codes and QPSK modulation like used in 5G signaling as will be discussed.

Figure 19:
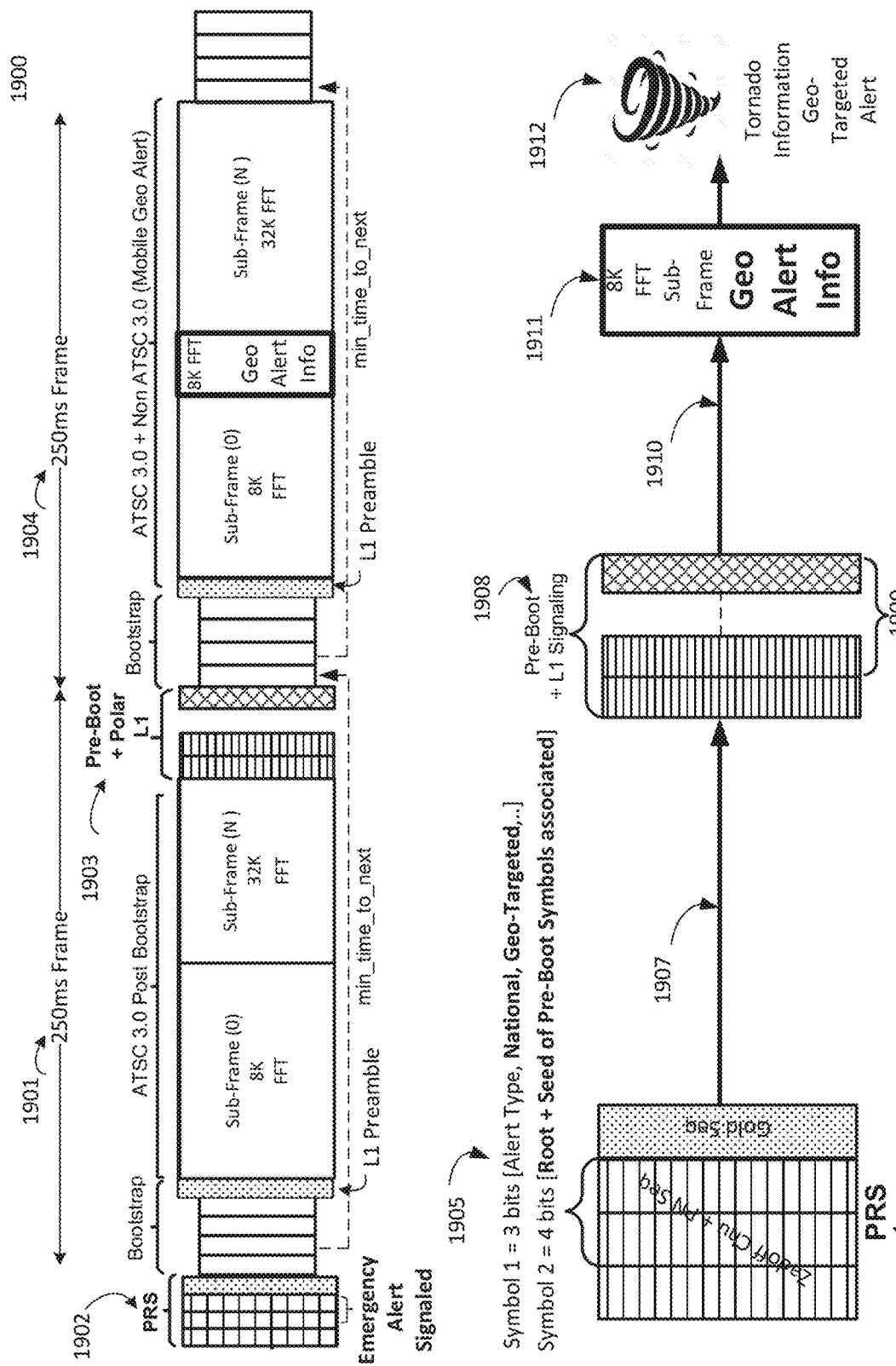
FIG. 19 illustrates an example of PRS and pre-boot signals used for device based geo-fencing, in accordance with some embodiments. When PNT receiver is triggered, the PRS signaling informs a receiver to search for pre-boot and L1 signaling to obtain the emergency alerting and/or targeted information data, in accordance with some embodiments.

FIG. 19 illustrates diagram 1900 illustrating high-level example of geo-targeted emergency alert and introduces how PRS symbols 1902, 1905 and pre-boot symbols and L1 signaling 1903, 1908 are used together to enable service 1912, according to some embodiments. Time aligned frame 1901 has pre-boot symbols 1903 in the frame immediately following frame with PRS 1902 cadence insertion.

The PRS symbols 1 and symbols 2 1905 can each signal (2-12 bits) information using cyclic shifts ZC that are Gray coded 1200. In this example, PRS symbol 1 has 3 bits of robust signaling for the type of emergency alert and if one exists. Some possible types of emergency alert can include, but are not limited to, National Alert all receivers respond or various geo-targeted emergency alert types, etc. In one example, if alert is present, symbol 2 can have 6 bits and can signal (root and seed) values of pre-boot symbols+L1 signaling 1908 associated with the alert and time (future) when pre-boot symbols+L1 signaling 1908 will appear in broadcast. As discussed in FIG. 12, the number of signaling bits in each symbol 1905 is a function of the gray code error tolerance selected and is variable (2-12 bits).

This example assumes that a geo-targeted alert is active and signaled. The PNT receiver knows it position using 1906 and is vectored 1907 by signaling 1905 to search for pre-boot symbols+L1 signaling 1908, which is discovered placed at the end of frame 1901 as shown. The pre-boot symbols and L1 signaling 1908 using Polar codes 1909 signals the geo-graphic area associated with emergency alert as a polygon or circle coordinates on a map as discussed with respect to FIG. 21. The receiver knowing its current position 1906 determines if it is inside the geo-targeted emergency alert area. If the receiver is inside the alert area, more signaling information 1909 is gathered, else the alert is ignored if outside the alert area.

If the receiver has determined it is inside the emergency alert area, the receiver accesses more specifics on the alert by accessing information placed inside a special ATSC 3.0 sub-frame 1911 placed in frame 1904. The L1 signaling using Polar codes 1909 will direct the receiver to special sub-frame 1911 having a physical layer pipe PLP that carry alert information. The alert information can be A/V, maps, etc. The instructions on the emergency (in this case a tornado 1912) is quickly consumed. In this example, the time elapsed from when the alert notice was triggered by authority 1902 to the receiver inside alert area receiving the emergency information can be less than 1 second.

Figure 20:
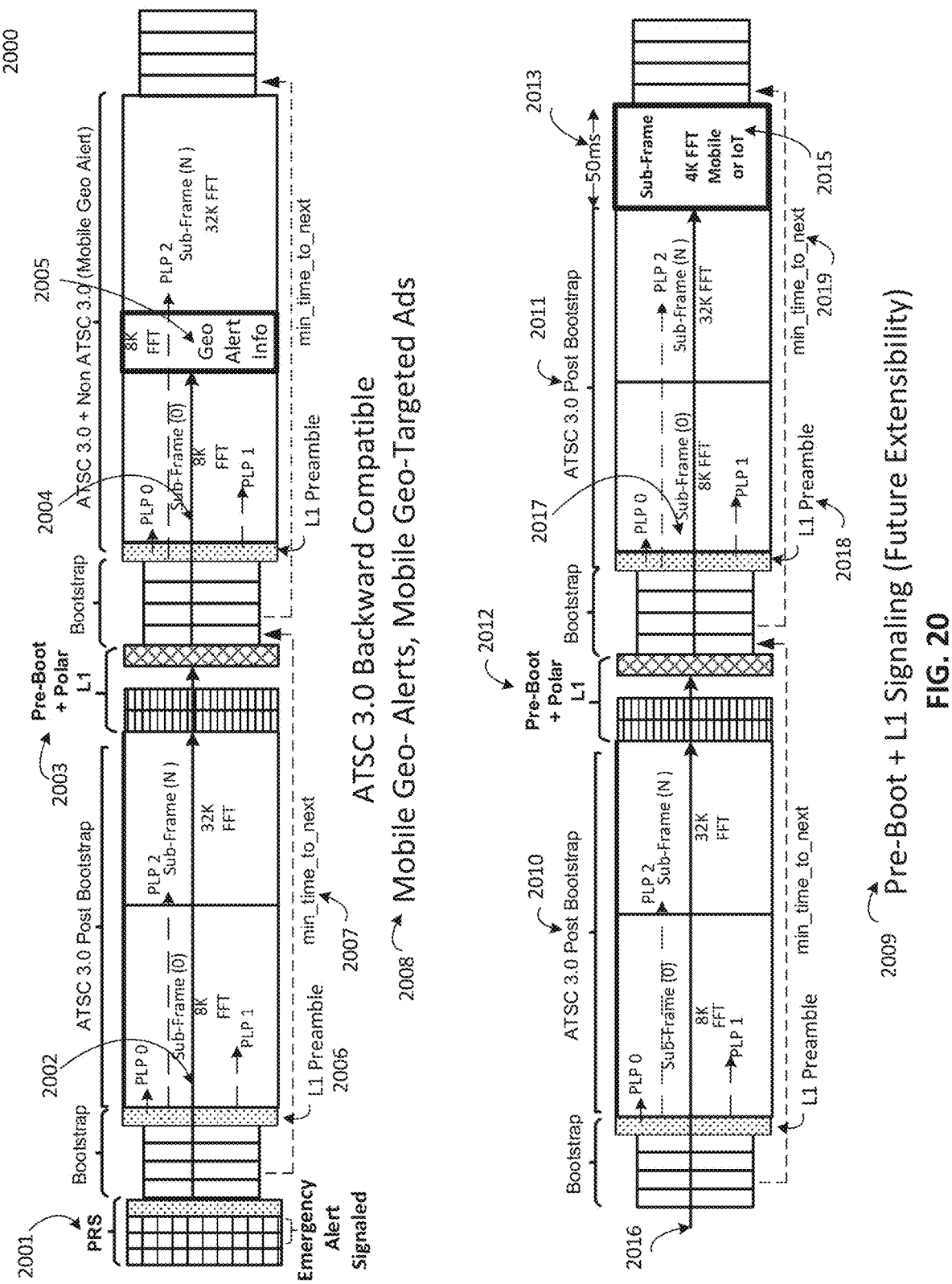
FIG. 20 illustrates examples of the signaling for enabling ATSC 3.0 backward compatible Geo Alerts, Geo Targeted Ads, and the pre-boot and L1 signaling used for future extensibility (such as new mobile services), in accordance with some embodiments.

FIG. 20 illustrates diagram 2000 illustrating two example frames, according to some embodiments. In one example, Frame 2008 are directed to mobile geo-alerts and geo-targeted ads. Frames 2009 are directed to pre-boot and L1 signaling for extensible 4K FFT sub-frame 2013 and PLP 2015 for optimized mobile services aligned 5G and or IoT services.

Backward compatible ATSC 3.0 geo-alerting and targeting ads 2008 is discussed. ATSC 3.0 bootstrap and L1 signaling and flexible frame and cell multiplexing capability is leveraged along with PRS symbols 2001 and pre-boot symbols and L1 signaling 2003 to ensure ATSC 3.0 backward compatibility. ATSC 3.0 receivers continue working unaware of existence PRS symbols 2001, pre-boot symbols and L1 signaling 2003 and Geo-targeted services in 2005.

The ATSC 3.0 (PRS capable) gateway 109 of FIG. 1 schedules OFDM resources and generates L1 signaling without a change in the ATSC 3.0 standard. The scheduler will evolve from an appliance to SDN/NFV cloud-native in future as previously mentioned.

The basic ATSC 3.0 reception process is discussed using bootstrap and L1 preamble 2006 for insight into backward compatibility. An ATSC 3.0 receiver's recovery of IP data or content in PLPs (PLP 0, PLP 1, PLP 2) in separate sub-frames 8K FFT for mobile and 32K FFT for fixed services in the two frames are shown. The reception starts with first symbol #0 of bootstrap, which provides the receiver synchronization and the correlation bootstrap identifies signal as ATSC 3.0 by using (root and seed) values specified in ATSC 3.0 standard. The remaining 3 bootstrap symbols provide signaling including minimum time to the next ATSC 3.0 frame 2007. L1 preamble 2006 contains L1 detailed signaling for locating and decoding PLPs in sub-frames. Other L1 signaling 2006 can include the length of the frame, how many sub-frames, symbols, FFT sizes, PLP modulation and LDPC code rate and how the PLP cells are scheduled across the symbols of sub-frames in post bootstrap portion of frame (as shown in FIG. 20).

The receiver determines the PLP # that has IP content or data of interest by using other signaling in ATSC 3.0 standards not discussed herein.

In some embodiments, the ATSC 3.0 reception starts with bootstrap and proceeds with L1 preamble 2006 to obtain detailed L1 signaling for PLP # of interest. Once detailed L1 signaling is obtained, the PLP # of interest and cells or sub-carriers scheduled across symbols of sub-frame are located and the IP content or data is recovered. Other PLP # in the frame are ignored by receiver. This selective reception process saves battery on portable devices.

Turning to discussion of receivers for new services of geo-targeting 2008, these receivers are also aware of ATSC 3.0 signaling. PRS symbols 2001 are shown signaling an emergency alert as discussed with respect to FIG. 19. The receiver needs to determine if its current location is inside geo-targeted emergency alert area. PRS symbols 2001 and vectors 2002 assist to search for pre-boot and L1 signaling 2003 with (root+seed) signaled by PRS symbols 2001. Pre-boot and L1 signaling 2003 is found and includes L1 detailed signaling to locate special 8K FFT sub-frame 2005 and PLP with geo-alert information located inside. Some receivers (e.g., new receivers) are also ATSC 3.0 capable and may, for example, use ATSC 3.0 Bootstrap and L1 signaling and receive PLP 1 in 8K FFT sub-frame 0 when emergency alert is signaled 2001.

The scheduling of sub-frame 2005 is done in a way ATSC 3.0 receivers will recognize it exists but not be aware of the PLP inside. The pre-boot and L1 signaling 2003 is used to recover PLP inside sub-frame 2005 for the receiver. The ATSC 3.0 frame structure, pilots, FFT size, QAM modulation and LDPC, etc. is re-used for the PLP in sub-frame 2005. The existence of PLP in 2005 is hidden from legacy ATSC 3.0 receivers and only new receivers using pre-boot and L1 signaling 2003 can receive PLP.

The ATSC 3.0 legacy signaling is used to help ensure backward compatibility by signaled length of frame (bootstrap and post bootstrap portion) in preamble 2006 which is shorter by amount to accommodate pre-boot and L1 signaling 2003. Also, bootstrap symbol 1 signals minimum time to next 2007 start of next ATSC 3.0 frame. These both can ensure that pre-boot and L1 signaling 2003 can be inserted after post-bootstrap portion and ATSC 3.0 receivers will maintain proper operation.

Next example of future extensibility 2009 is discussed. A sub-frame 2013 with 4K FFT size not specified in ATSC 3.0 standard is used with PLP 2015 optimized for mobile and or IoT services. By positioning sub-frame 2013 at end of frame with ATSC 3.0 signaling 2018, previously discussed backward compatibility with ATSC 3.0 is ensured.

The ATSC 3.0 post bootstrap 2010, 2011 supports ATSC 3.0 services in PLP 0, PLP 1, PLP 2 as shown. There is new pre-boot and L1 signaling 2012 using different assigned (root+seed) 1809 to enable future extensibility. The receiver has been signaled by some means to search and correlate for (root and seed) assigned 2012 to locate sub-frame 2013 4K FFT and receive mobile or IoT services in the PLP 2015.

The receiver locates start pre-boot 2012, receives L1 detailed signaling 2017 to locate sub-frame 2013 and PLP 2015, and the mobile and or IoT services is recovered.

From perspective of the ATSC 3.0 receiver, the ATSC 3.0 receiver is agnostic to the L1 signaling 2018, the frame length 2011, and the bootstrap 2019 signaling of start of next ATSC 3.0 frame as shown. The ATSC 3.0 receiver jumps over sub-frame 2013 to start of next ATSC 3.0 frame. From the ATSC 3.0 L1 signaling frame ends 2011 before sub-frame 2013 starts and ATSC 3.0 receiver proceeds directly to start of next ATSC 3.0 frame as signaled 2019.

PRS symbols 2001 and several pre-boot and L1 signaling 2012 can be used simultaneously. The length of sub-frame 2013 can be changed and can be signaled by pre-boot and L1 signaling 2012 to determine mix of new services in future without compromising ATSC 3.0. To remain competitive driven by market forces in future of 5G and Open RAN when scheduler is cloud-native as previously mentioned.

Figure 21:
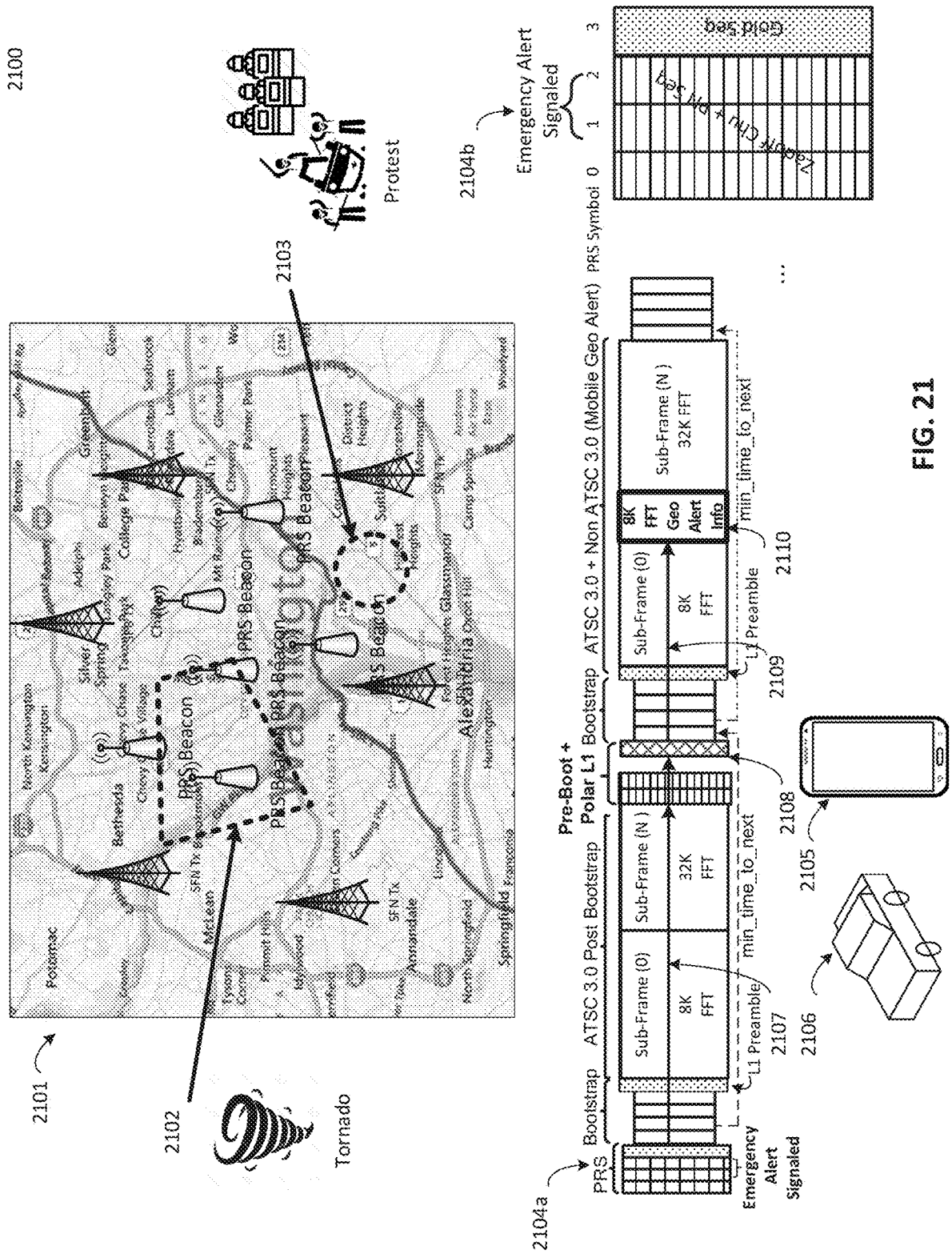
FIG. 21 illustrates example of device based geo-fencing showing signaling of emergency alert using polygons or circles that determine a geographic boundary using a PNT receiver determining whether a current position lays within emergency boundary and then triggering an alert, in accordance with some embodiments.

FIG. 21 illustrates diagram 2100 illustrating an example device-based geo-targeted emergency alerts for a city 2101 (in this example Washington, D.C.), according to some embodiments. With SFN transmitters and PRS beacon transmitters distributed as shown, polygon 2102 represents the coordinates of geographic area for weather emergency (in this case a tornado emergency alert.) and circle 2103 represents the coordinates of geographic area for an emergency alert (for example, civil unrest). These alerts are signaled using PRS symbols 2104a. PRS receivers 2105, 2106 first determine if their current position is inside a geographic alert area. Signaling 2104b indicates the type of emergency alerts active and how (e.g., using 2107) to access (root and seed) of pre-boot+L1 signaling 2108.

Pre-boot+L1 signaling 2108 can provide coordinates of polygon area 2102 for weather alert and circle area 2103 for the civil unrest. Receivers 2105, 2106 determine if their current position is inside 2102 or 2103. If not inside these geographic areas, receiver 2105, 2106 ignore the alert(s). If the current position is inside area 2102 or 2103, pre-boot +L1 signaling 2108 vectors 2109 to the sub-frame 2110 which has emergency information for each alert. The emergency alert area for polygon 2102 is dynamic and position moves overtime and pre-boot+L1 signaling 2108 for 2102 will update and track this trajectory with new alert areas 2102 controlled by weather authority until alert is terminated. The sub-frame 2110 has PLP # for weather tornado alert and another PLP # for civil unrest alert both with potentially life-saving information A/V, graphics, etc. updated in real-time.

Figure 22:
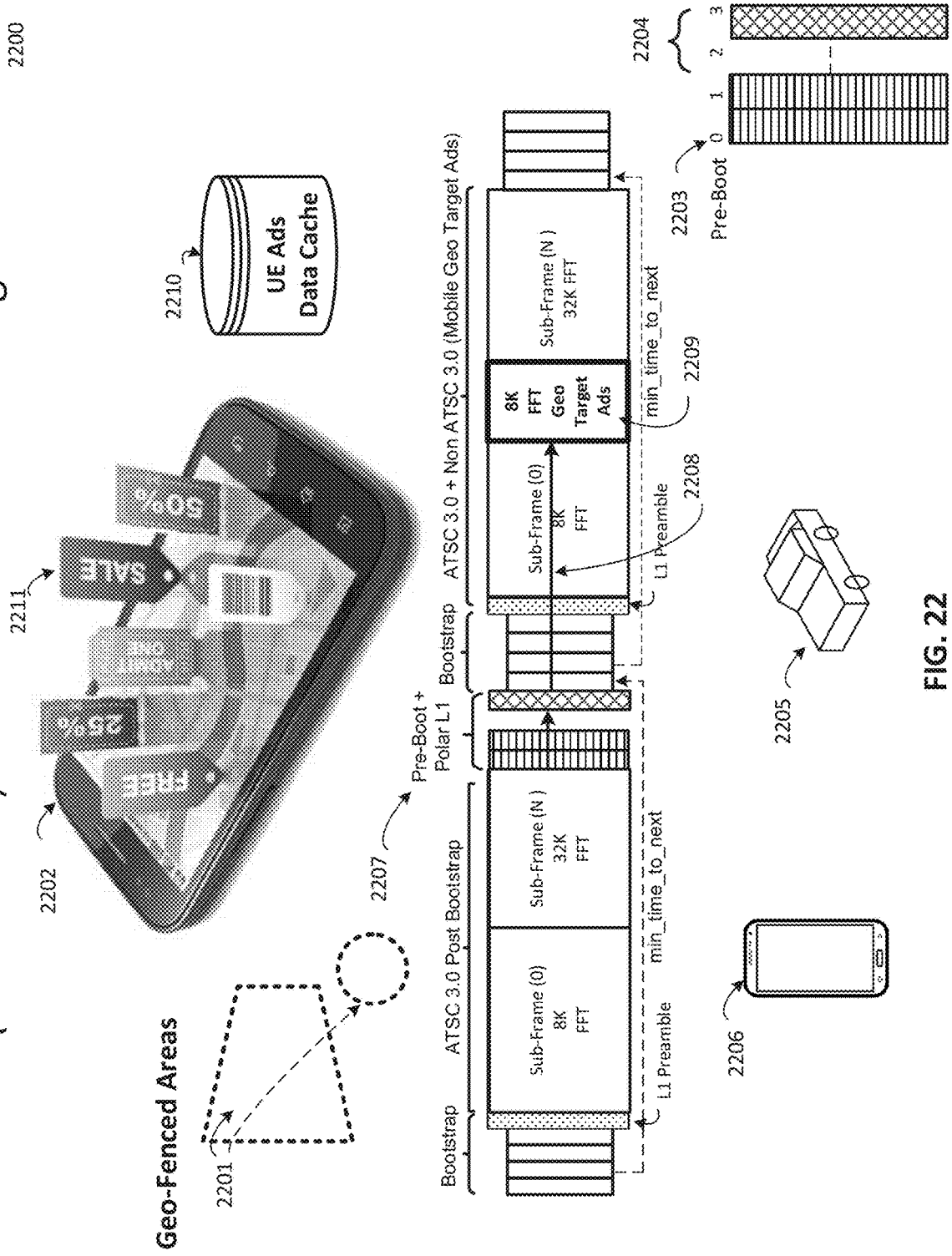
FIG. 22 illustrates an example of device based geo-fencing to determine if the PNT receiver is inside a targeted geographic area being used for location-based advertising and then an offer is presented user, in accordance with some embodiments.

FIG. 22 illustrates diagram 2200 illustrating an example of geo-fenced location based advertising with geo-fenced area coordinates 2201 determined by an advertiser, according to some embodiments. It is assumed that the consumer has opted in to receive ads and offers, coupons, etc., and consumer profile is in a database.

The pre-boot+L1 signaling 2207 capability is used again with new (root and seed) values 1806, 1807 assigned and new signaling syntax and semantics for this application of device-based geo-targeted advertising.

Receivers 2205, 2206 have PRS location capability. GUI 2202 of receiver 2206 illustrates pop-up ads, coupons 2211, etc., targeted to the consumer. When receiver 2206 is inside area 2201 and monitoring cadence of 2207, 2303 and signaling 2204 indicates preference for advertiser, signaling 2204 is triggered for receiver 2206. Signaling 2208 directs to sub-frame 2209 with PLP content including pop-up ads, coupons, etc. to be presented 2211 to the consumer. Also, trigger 2204 on receiver 2206 can also present ad pop-up from cache on receiver 2206 that has been pre-loaded by advertiser.

These services can use positioning. FIG. 23 discusses the reliability of a system including new research on PNT receiver algorithms using PRS symbols and the strengths of this broadcast local position system.

FIG. 23 illustrates diagram 2300 illustrating a system view of a total PNT system, according to some embodiments. This includes a segment of terrestrial SFN transmitters and Beacons, segment of monitoring stations 2301, and user segment PNT receiver 2302.

FIG. 23 illustrates ATSC 3.0 PRS capable scheduler 2304 and line of sight (LOS) signals 2305, 2306, 2307, 2308 arriving at an instant of time as PNT receiver 2302 moves on a trajectory shown in FIG. 23. The PNT diversity 1600 is shown in diagram 2300 with large number of PRS signals to select correlate (Gold code sequence) and observe channel impulse response (CIR) 2303 of each SFN transmitter or beacon signal at 2302. The probability of receiving and detecting 3 LOS signals for 2D fix 2302 increases when number of signals available to select from is larger than 3 when the PNT receiver moves in the urban environment.

In some examples, the Gold code sequence N=4095 is selected, which has good cross correlation performance and gain and will produce channel impulse response (CIR) 2303 with needed dynamic range. PNT receiver 2302 can detect LOS signal(s) in CIR not just the highest amplitude impulse. As an example, transmitter 2309 has direct LOS path but is shadowed by obstacle 2310 and arrives first at 2303 but attenuated 2311 with respect to later arriving multipath shown in CIR. Dynamic range of Gold code sequence N=4095 is another strength to enable receiver algorithm development that detects first arriving but attenuated impulse 2311 a LOS signal and discard other impulses 2303.

The LOS detection can also be aided by 50-100 kW effective radiated power (ERP) SFN transmitters closer to receiver 2302, detected −20 dB SNR and, is at fixed location not a satellite in orbit 20,200 km in space is another strength. Another strength is degree of freedom in locating outdoors and indoors beacon transmitters 2306 to reduce geometric dilution of precision (GDOP).

Figure 24:
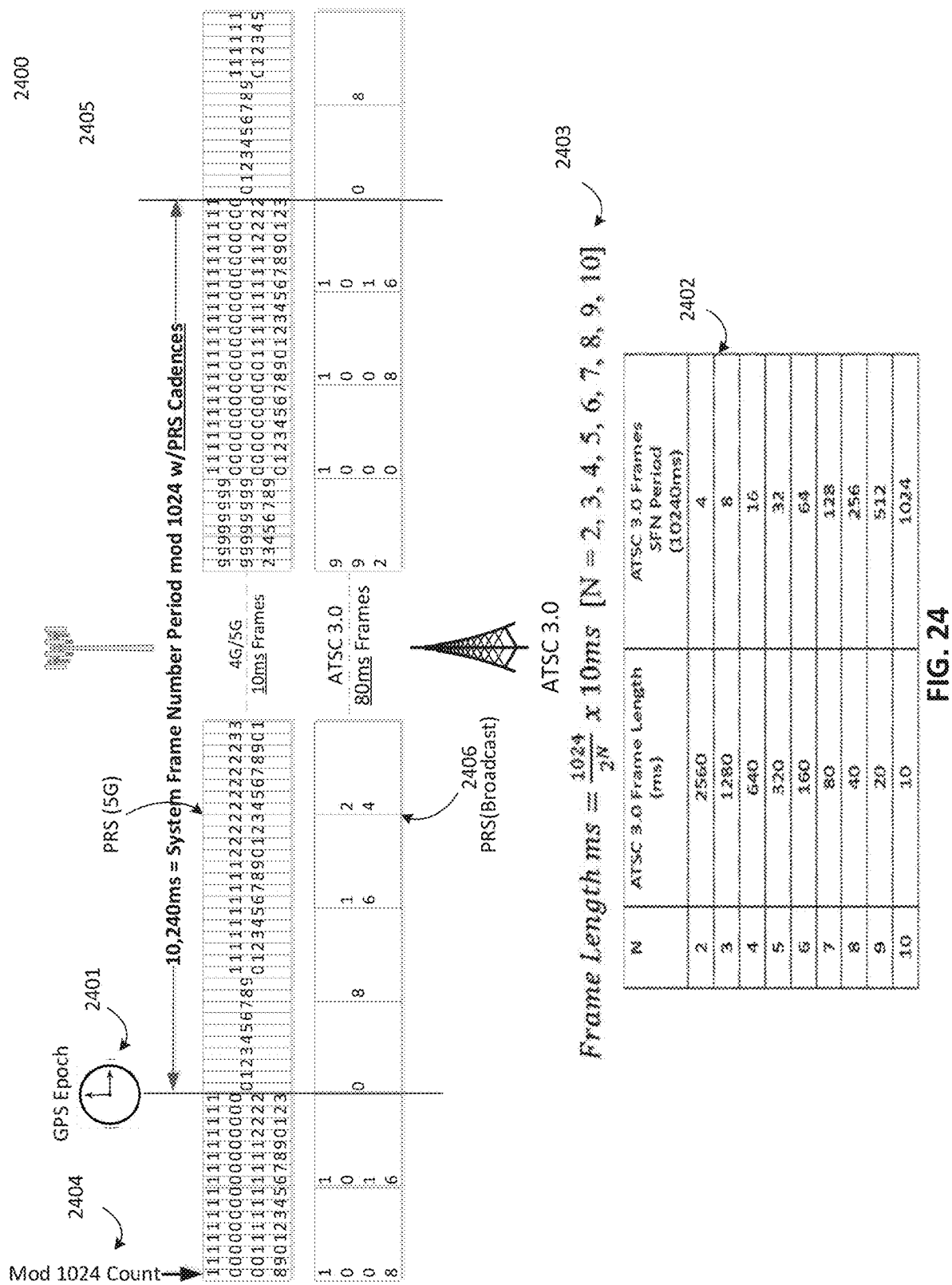
FIG. 24 illustrates example of integer ATSC 3.0 frames and 5GNR integer number of frames time aligned using GPS Epoch and 3GPP system frame number cadence 10240 ms with PRS cadences to support hybrid positioning (PNT), in accordance with some embodiments.
Figure 25:
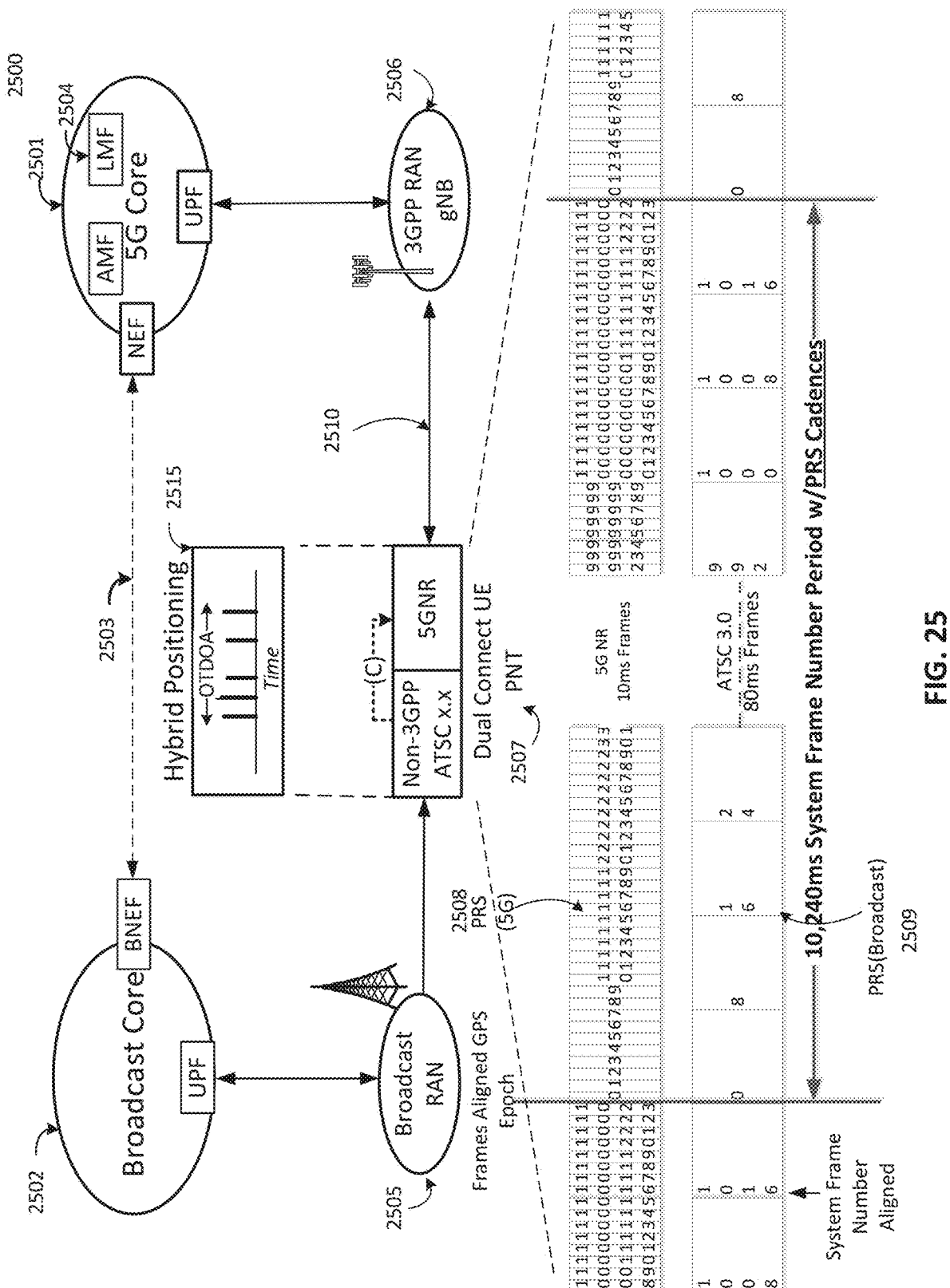
FIG. 25 illustrates an example of a hybrid positioning PNT system using synergy ATSC 3.0 and 5GNR with PRS cadences and interworking core networks and dual connected user equipment (UE) for cooperative hybrid OTDOA, in accordance with some embodiments.

Another way to improve reliability by using synergy of hybrid positioning system such 5G and broadcast PRS discussed briefly with respect to FIGS. 24 and 25.

FIG. 24 illustrates diagram 2400 illustrating synergy of frame alignment between ATSC 3.0 and 5G using GPS epoch and PRS symbol(s), according to some embodiments. The time aligned frames GPS epoch is disclosed in U.S. Patent Application Publication No. 2020/0178121 published Jun. 4, 2020 as previously mentioned.

FIG. 23 illustrates GPS epoch 2401, equation 2403, table 2402. Table 2402 shows the ATSC 3.0 frame sizes that have integer number of frames in 10240 ms (the system frame number period defined in 5G). The system frame number count is carried in L1 signaling in each 10 ms frame in 5G 2404. It is disclosed in U.S. Patent Application Publication No. 2020/0178121 that aligned ATSC 3.0 can also carry same system frame number count in 10240 ms shown 2404. To help 5G determine OTDOA, 3GPP has defined the position reference signal_PRS 2405. To help ATSC 3.0 to determine OTDOA the position reference symbols PRS 2406 are defined herein. The PRS 2405, 2406 are different in construction and implementation but can be seen as synergistic in a hybrid positioning system 2500 with time aligned as shown 2400.

FIG. 25 illustrates diagram 2500 illustrating synergy of frame alignment between ATSC 3.0 and 5G using GPS epoch, and PRS 5G 2508, and PRS broadcast 2509. The 5G core network 2501 and broadcast core network 2502 interwork 2503. Broadcast RAN 2505 and 5G RAN 2506 are shown supporting 5G receiver that has broadcast ATSC x.x in Dual Connected UE 2507 with PNT capability using PRS.

In 5G, the PRS symbol is used only to measure OTDOA but observation is sent to 5G core network 2501. Location management function (LMF) 2504 performs calculations, etc., and passes the correction or location back to UE 2507. Whereas ATSC 3.0 PRS receiver does OTDOA measurements and all calculation to determine the correction or location locally at the receiver.

With 5G and ATSC 3.0 frames aligned and insertion PRS 2508, 2509, the ATSC 3.0 receiver PRS can pass OTDOA measurements to LMF 2504, which does hybrid calculation of position and returns fix to 2507. This would require cooperation with 3GPP and MNO in future but is option.

According to some aspects, an electronic device (e.g., a PRS capable gateway, an ATSC 3.0 PRS capable exciter, single frequency network (SFN) transmitter, etc. as discussed in disclosure) can be configured to select a length for an ATSC 3.0 frame for transmission. The electronic device can be configured to align itself the SFN transmitter with a global positioning system (GPS) epoch and store geographical coordinates of the SFN transmitter and a corresponding SFN transmitter identification (TX ID) in a database. The electronic device can further be configured to encode the SFN TX ID in a non-coherent symbol of a plurality of positioning navigation timing (PNT) symbols including a plurality of coherent symbols and the non-coherent symbol. The electronic device can further be configured to prepend the plurality of PNT symbols to the ATSC 3.0 frame to generate a modified ATSC 3.0 frame and transmit the modified ATSC 3.0 using a SFN transmitter antenna of the SFN transmitter.

In some embodiments, encoding the SFN TX ID in the non-coherent symbol of the plurality of PNT symbols can include generating a Gold sequence code based on at least two polynomial equations. In some embodiments, the plurality of coherent symbols are generated using a PNT composite sequence generator including a Zadoff-Chu (ZC) sequence generator and a pseudo-random noise (PN) sequence generator. In some embodiments, the ZC sequence generator generates the ZC sequence based on a prime number value from a set of prime numbers. In some examples, the set of prime numbers can include, but is not limited to 3343, 4099, 6899 and 8191.

In some embodiments, a first PNT symbol of the plurality of PNT symbols is used for synchronization at a PNT receiver. In some embodiments, a second PNT symbol and a third PNT symbol of the plurality of PNT symbols are used for sending a notification to a user of a user equipment. In some embodiments, the notification to the user is an emergency alert or a targeted content for delivery to the user.

Various embodiments may be implemented, for example, using one or more processors, computing devices, computer systems. Also or alternatively, one or more computer systems may be used, for example, to implement any of the embodiments discussed herein, as well as combinations and sub-combinations thereof.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   selecting a length for an advanced television system committee (ATSC) 3.0 frame for transmission by a single frequency network (SFN) transmitter;
   aligning the SFN transmitter with a global positioning system (GPS) epoch;
   storing geographical coordinates of the SFN transmitter and a corresponding SFN transmitter identification (TX ID) in a database;
   encoding the SFN TX ID in a non-coherent symbol of a plurality of positioning navigation timing (PNT) symbols comprising a plurality of coherent symbols and the non-coherent symbol with orthogonal frequency-division multiplexing (OFDM) numerology to support positioning;
   prepending the plurality of PNT symbols to the ATSC 3.0 frame to generate a modified ATSC 3.0 frame; and
   transmitting the modified ATSC 3.0 frame using an SFN transmitter antenna of the SFN transmitter.

2. The method of claim 1, wherein encoding the SFN TX ID in the non-coherent symbol of the plurality of PNT symbols comprises generating a Gold sequence code based on at least two polynomial equations.

3. The method of claim 1, wherein the plurality of coherent symbols are generated using a PNT composite sequence generator comprising a Zadoff-Chu (ZC) sequence generator and a pseudo-random noise (PN) sequence generator.

4. The method of claim 3, wherein the ZC sequence generator generates a ZC sequence based on a prime number value from a set of prime numbers.

5. The method of claim 1, further comprising using a first PNT symbol of the plurality of PNT symbols for synchronization at a PNT receiver.

6. The method of claim 1, further comprising using a second PNT symbol and a third PNT symbol of the plurality of PNT symbols for sending a notification to a user of a user equipment.

7. The method of claim 6, wherein the notification to the user is an emergency alert or a targeted content for delivery to the user.

8. The method of claim 1, wherein:
   the plurality of PNT symbols comprises one or more pre-boot symbols and one or more Layer 1 (L1) symbols,
   the one or more pre-boot symbols are generated based on a Zadoff-Chu (ZC) sequence and a pseudo-random noise (PN) sequence, and
   the one or more pre-boot symbols and the one or more L1 symbols are configured to direct a user equipment (UE) in at least one of a device-based geo-targeting or a targeting advertisement using geo-fencing.

9. The method of claim 8, further comprising:
   generating the one or more pre-boot symbols using a sampling frequency of 6.144 MHz, an inverse fast Fourier transform (IFFT) with a size of 2048, a subcarrier spacing of 3 kHz, a ZC length of 1913, and a cyclic shift of 8 bits/symbol.

10. The method of claim 8, further comprising:
    using polar codes and quadrature phase shift keying (QPSK) modulation with the one or more L1 symbols.

11. An apparatus, comprising:
    a memory to store instructions; and
    a processor configured to perform the instructions to:
       select a length for an advanced television system committee (ATSC) 3.0 frame for transmission by a single frequency network (SFN) transmitter;
       align the SFN transmitter with a global positioning system (GPS) epoch;
       store geographical coordinates of the SFN transmitter and a corresponding SFN transmitter identification (TX ID) in a database;
       encode the SFN TX ID in a plurality of positioning navigation timing (PNT) symbols;
       prepend the plurality of PNT symbols to the ATSC 3.0 frame to generate a modified ATSC 3.0 frame; and
       transmit the modified ATSC 3.0 frame using an SFN transmitter antenna of the SFN transmitter.

12. The apparatus of claim 11, wherein to encode the plurality of PNT symbols, the processor is configured to use a non-coherent composite sequence configured to uniquely identify the SFN transmitter, wherein the non-coherent composite sequence comprises a Gold code sequence.

13. The apparatus of claim 12, wherein the processor is further configured to perform the instructions to generate a coherent and non-coherent composite sequence using a PNT composite sequence generator comprising a coherent Zadoff-Chu (ZC) sequence generator and a pseudo-random noise (PN) sequence generator and a non-coherent Gold code sequence.

14. The apparatus of claim 13, wherein the ZC sequence generator generates the ZC sequence based on a prime number value from a set of prime numbers comprising 3343, 4099, 6899 and 8191 and wherein the Gold code sequences comprises a length from a set comprising 2047, 4095, and 8191.

15. The apparatus of claim 11, wherein a first PNT symbol of the plurality of PNT symbols is used for synchronization at a PNT receiver.

16. The apparatus of claim 11, wherein to encode the plurality of PNT symbols, the processor is further configured to perform the instructions to encode augmentation data in a third PNT symbol and a fourth PNT symbol of the plurality of PNT symbols.

17. A non-transitory computer-readable medium including instructions stored thereon that, when executed by at least one computing device, cause the at least one computing device to perform operations comprising:
    selecting a length for an advanced television system committee (ATSC) 3.0 frame for transmission by a single frequency network (SFN) transmitter;
    aligning the SFN transmitter with a global positioning system (GPS) epoch;
    storing geographical coordinates of the SFN transmitter and a corresponding SFN transmitter identification (TX ID) in a database;
    encoding the SFN TX ID in a non-coherent symbol of a plurality of positioning navigation timing (PNT) symbols comprising a plurality of coherent symbols and the non-coherent symbol with orthogonal frequency-division multiplexing (OFDM) numerology to support positioning;
    prepending the plurality of PNT symbols to the ATSC 3.0 frame to generate a modified ATSC 3.0 frame; and
    transmitting the modified ATSC 3.0 frame using an SFN transmitter antenna of the SFN transmitter.

18. The non-transitory computer-readable medium of claim 17, wherein encoding the SFN TX ID in the non-coherent symbol of the plurality of PNT symbols comprises generating a Gold sequence code based on at least two polynomial equations.

19. The non-transitory computer-readable medium of claim 17, wherein the plurality of coherent symbols are generated using a PNT composite sequence generator comprising a Zadoff-Chu (ZC) sequence generator and a pseudo-random noise (PN) sequence generator.

20. The non-transitory computer-readable medium of claim 19, wherein the ZC sequence generator generates a ZC sequence based on a prime number value from a set of prime numbers.

* * * * *